US011390484B2

(12) United States Patent
Piotrowski

(10) Patent No.: US 11,390,484 B2
(45) Date of Patent: Jul. 19, 2022

(54) SYSTEMS AND METHODS OF MANUFACTURING FLEXIBLE SPRING MEMBERS FOR GAS SPRING ASSEMBLIES

(71) Applicant: Firestone Industrial Products Company, LLC, Indianapolis, IN (US)

(72) Inventor: James C. Piotrowski, Brownsburg, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 303 days.

(21) Appl. No.: 16/511,934

(22) Filed: Jul. 15, 2019

(65) Prior Publication Data

US 2020/0031607 A1 Jan. 30, 2020

Related U.S. Application Data

(63) Continuation of application No. 15/476,002, filed on Mar. 31, 2017, now Pat. No. 10,358,315.

(Continued)

(51) Int. Cl.
*B65H 49/00* (2006.01)
*B65H 49/32* (2006.01)
(Continued)

(52) U.S. Cl.
CPC .......... *B65H 49/32* (2013.01); *B29D 22/023* (2013.01); *B65H 59/16* (2013.01); *B65H 59/24* (2013.01); *B65H 2701/314* (2013.01)

(58) Field of Classification Search
CPC ...... B29D 22/023; B65H 59/16; B65H 59/24; B65H 49/32; B29C 53/56
See application file for complete search history.

(56) References Cited

U.S. PATENT DOCUMENTS 3,061,499 A 10/1962 Slemmons et al.
3,366,524 A * 1/1968 Iles ...................... B29D 22/023
156/166

(Continued)

FOREIGN PATENT DOCUMENTS

EP 0 085 214 8/1983
GB 829 480 9/1964
GB 969 891 9/1964

OTHER PUBLICATIONS

Extended European Search Report dated Oct. 6, 2017 for European Patent Application No. 17164093.1.

*Primary Examiner* — Emmanuel M Marcelo
(74) *Attorney, Agent, or Firm* — Thomas R. Kingsbury; Matthew P. Dugan

(57) ABSTRACT

Systems include a creel assembly supporting a plurality of spools containing at least one cord having an indeterminate length such that a plurality of cords are supported on the creel assembly. A tensioner assembly operative to tension approximately equal predetermined lengths of the plurality of cords received from the creel assembly. A building mandrel supported for rotation and translation. A head assembly supported in fixed relation to the building mandrel. The head assembly is positioned co-axially such that the building mandrel can pass through an opening in the head assembly during translation. Methods of manufacture are included, as are flexible spring members and gas spring assemblies.

20 Claims, 31 Drawing Sheets

Related U.S. Application Data

(60) Provisional application No. 62/316,855, filed on Apr. 1, 2016.

(51) Int. Cl.
    *B29D 22/02*    (2006.01)
    *B65H 59/16*    (2006.01)
    *B65H 59/24*    (2006.01)

(56) References Cited

U.S. PATENT DOCUMENTS

| | | | |
|---|---|---|---|
| 3,378,427 A * | 4/1968 | McClean | B65H 81/00 |
| | | | 156/431 |
| 5,524,834 A * | 6/1996 | Bogucki-Land | B65H 59/04 |
| | | | 242/147 M |
| 6,494,980 B1 | 12/2002 | Rothemeyer et al. | |
| 2003/0107148 A1* | 6/2003 | Davis | D04H 1/74 |
| | | | 264/112 |
| 2004/0144478 A1* | 7/2004 | Green | B29C 70/504 |
| | | | 156/161 |
| 2009/0126875 A1* | 5/2009 | Uozumi | B29C 53/64 |
| | | | 156/425 |
| 2009/0314872 A1* | 12/2009 | Uozumi | B29C 53/8016 |
| | | | 242/410 |
| 2011/0083500 A1* | 4/2011 | Rensel | F16F 9/3292 |
| | | | 73/117.03 |
| 2014/0238612 A1* | 8/2014 | Vaniglia | B65H 59/04 |
| | | | 156/510 |

* cited by examiner

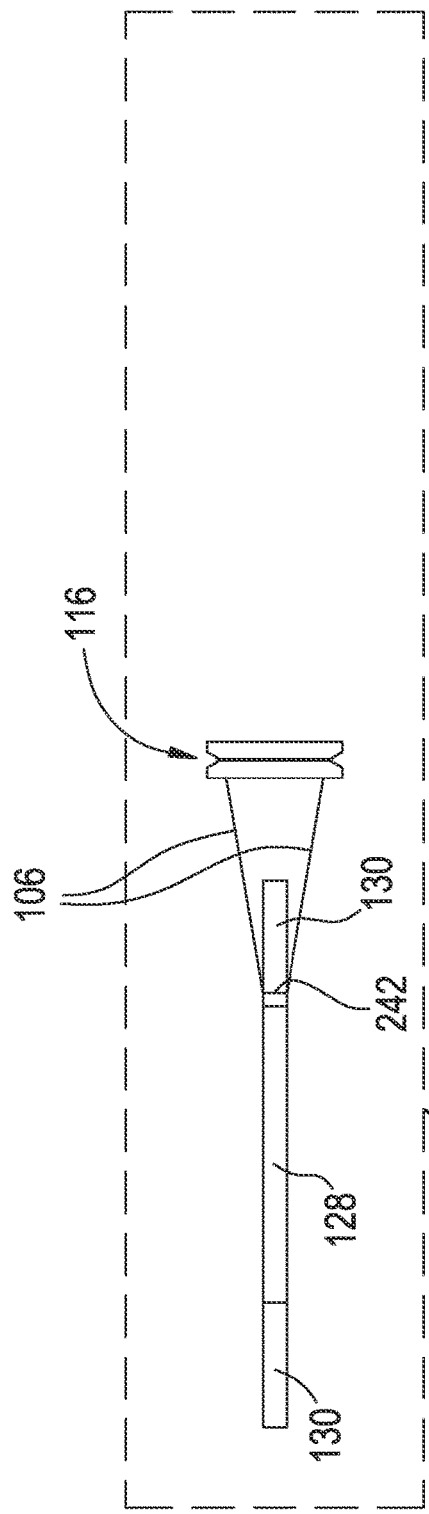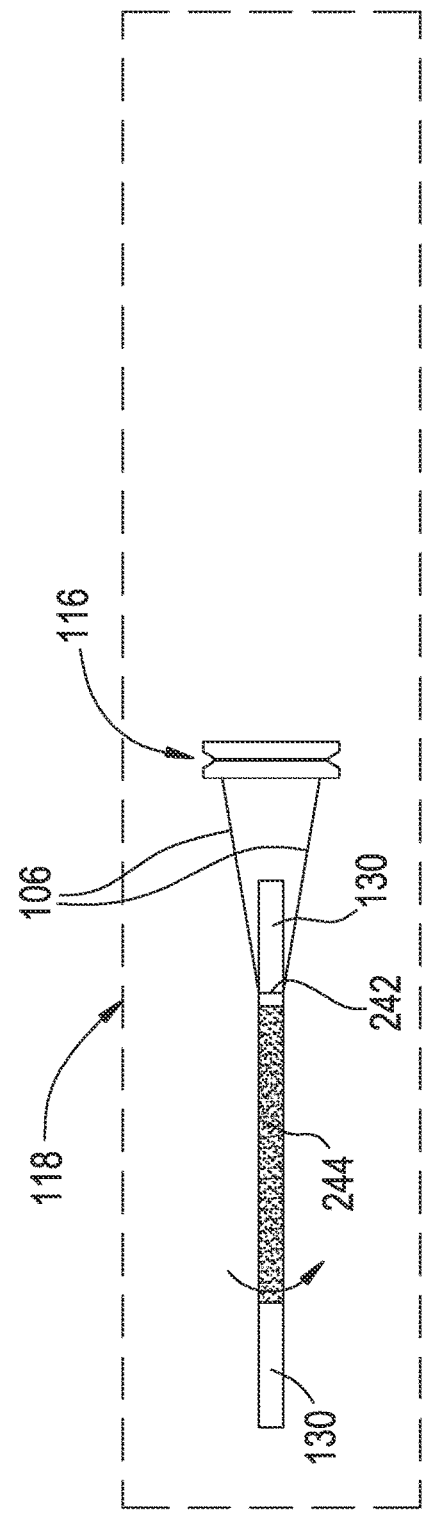

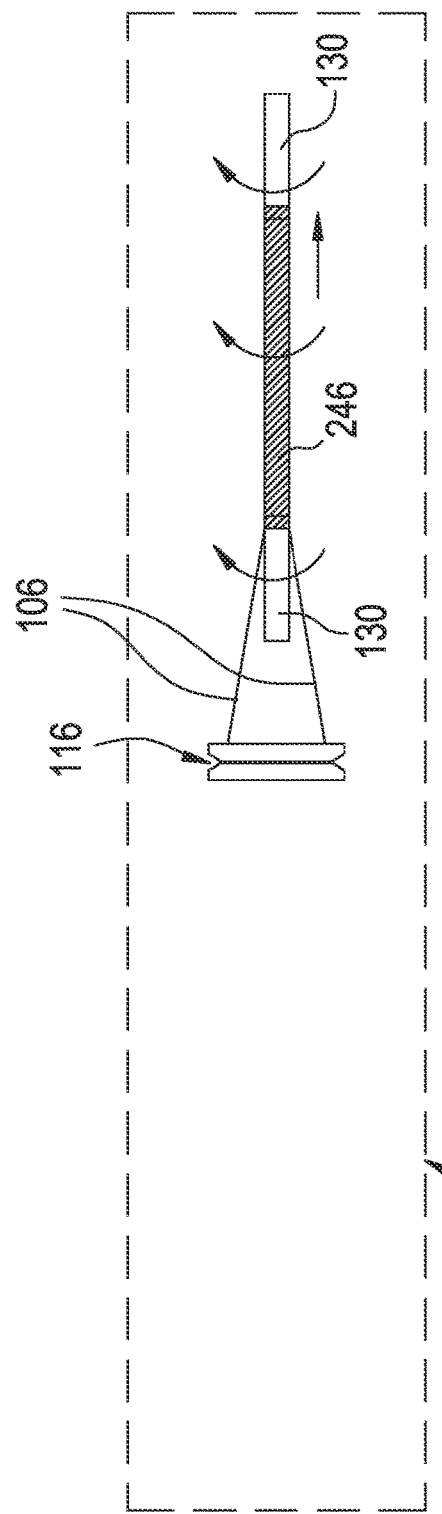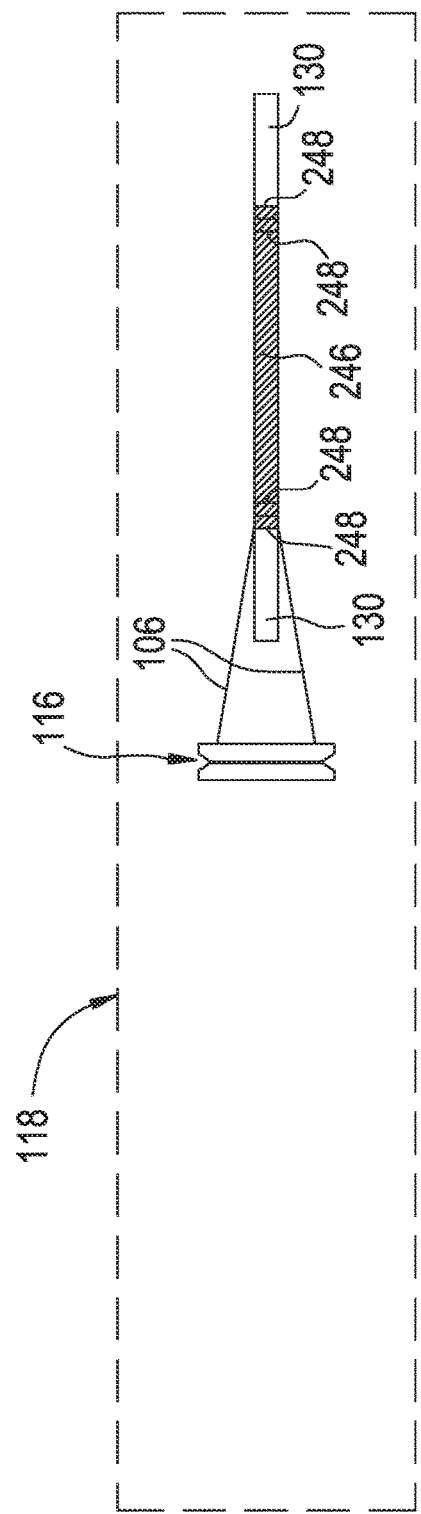

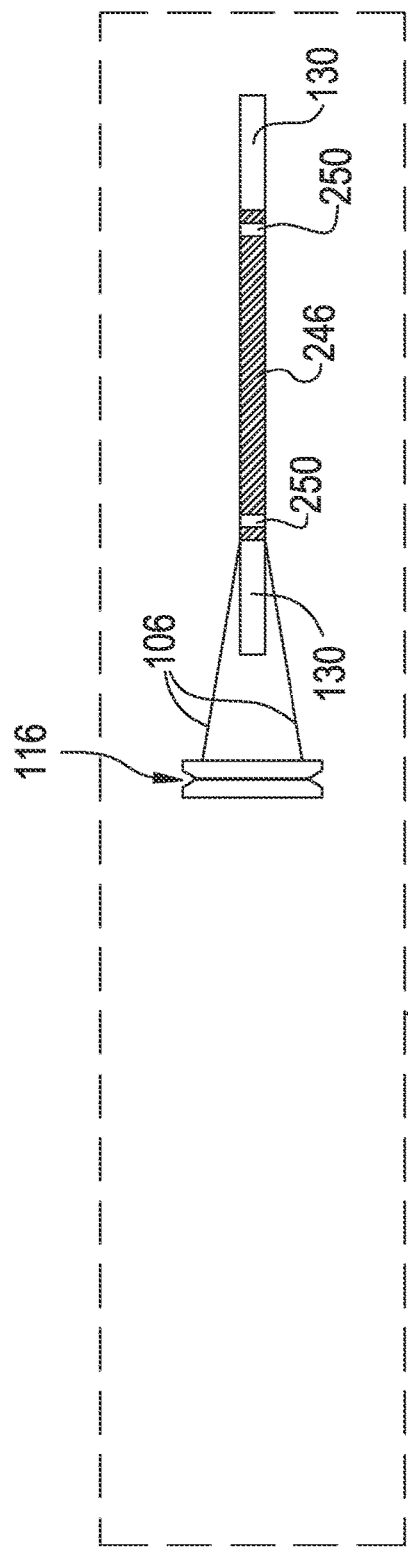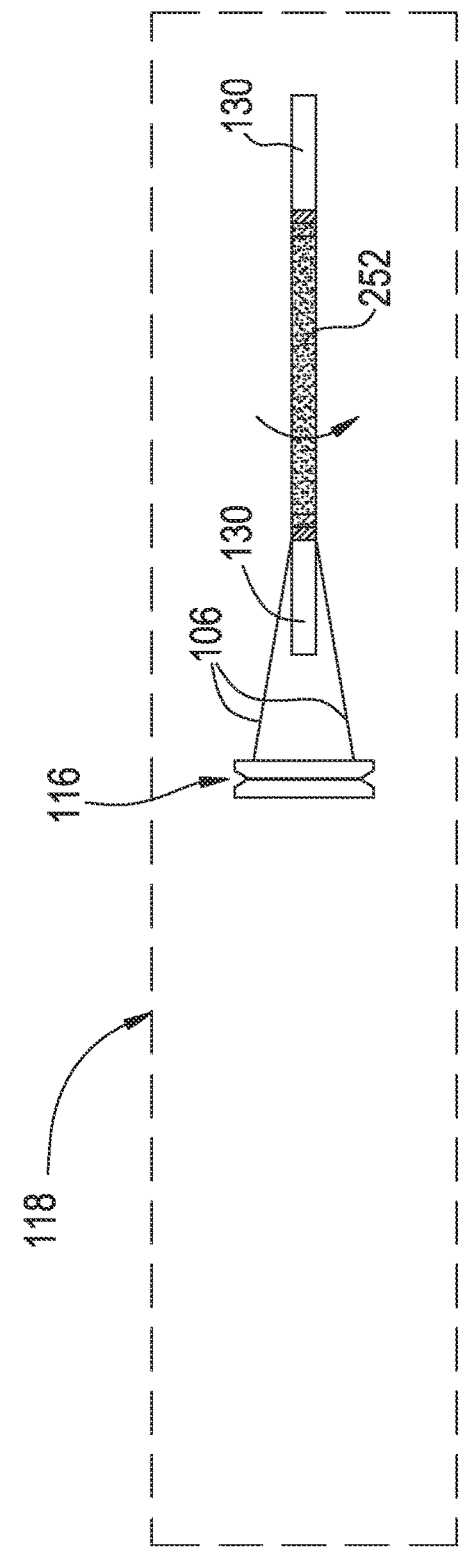

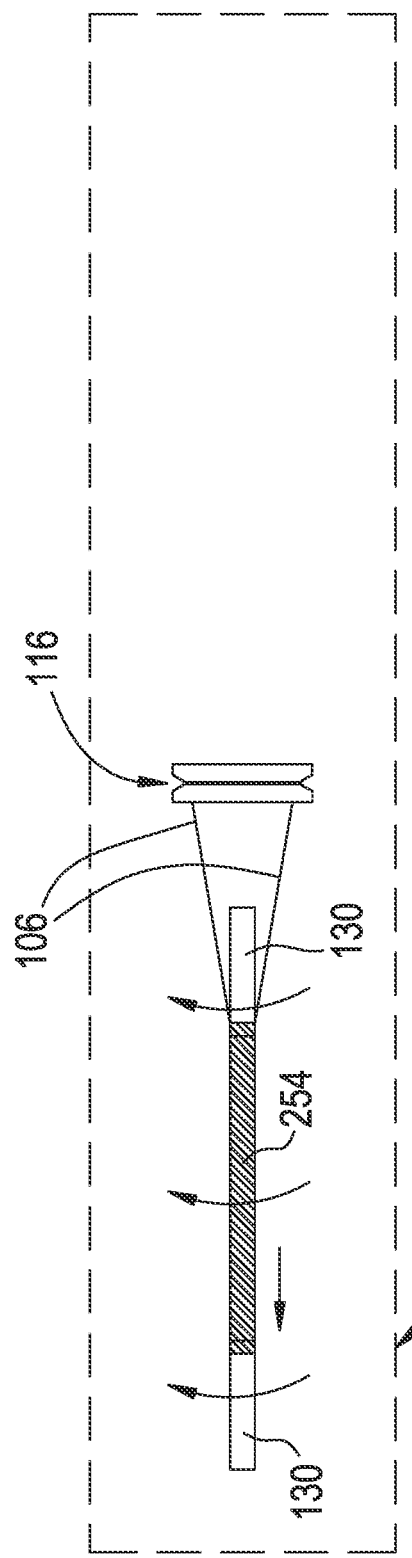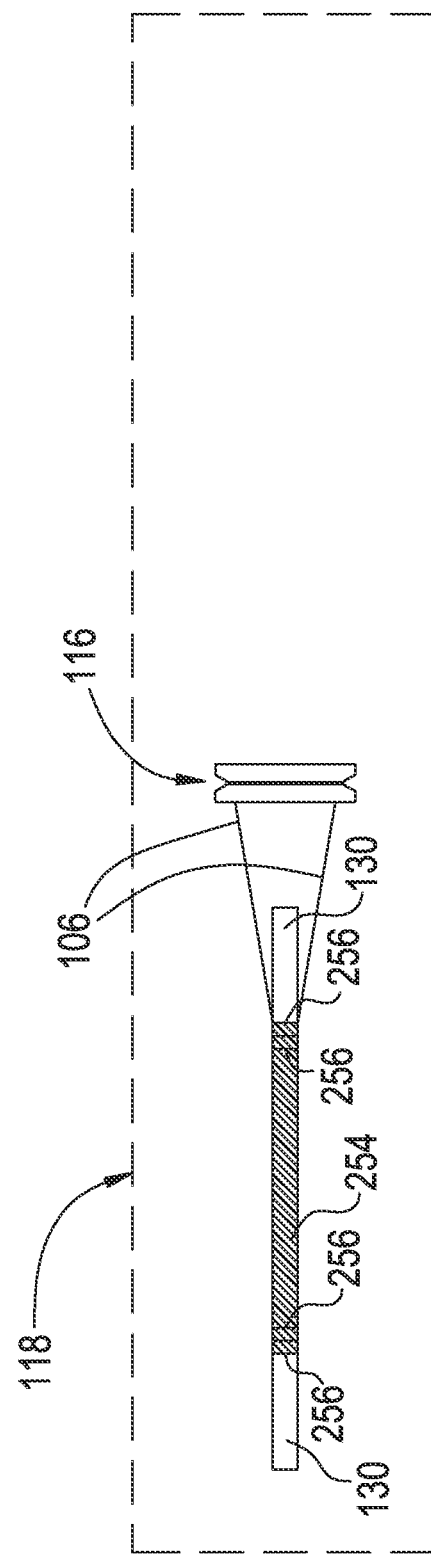

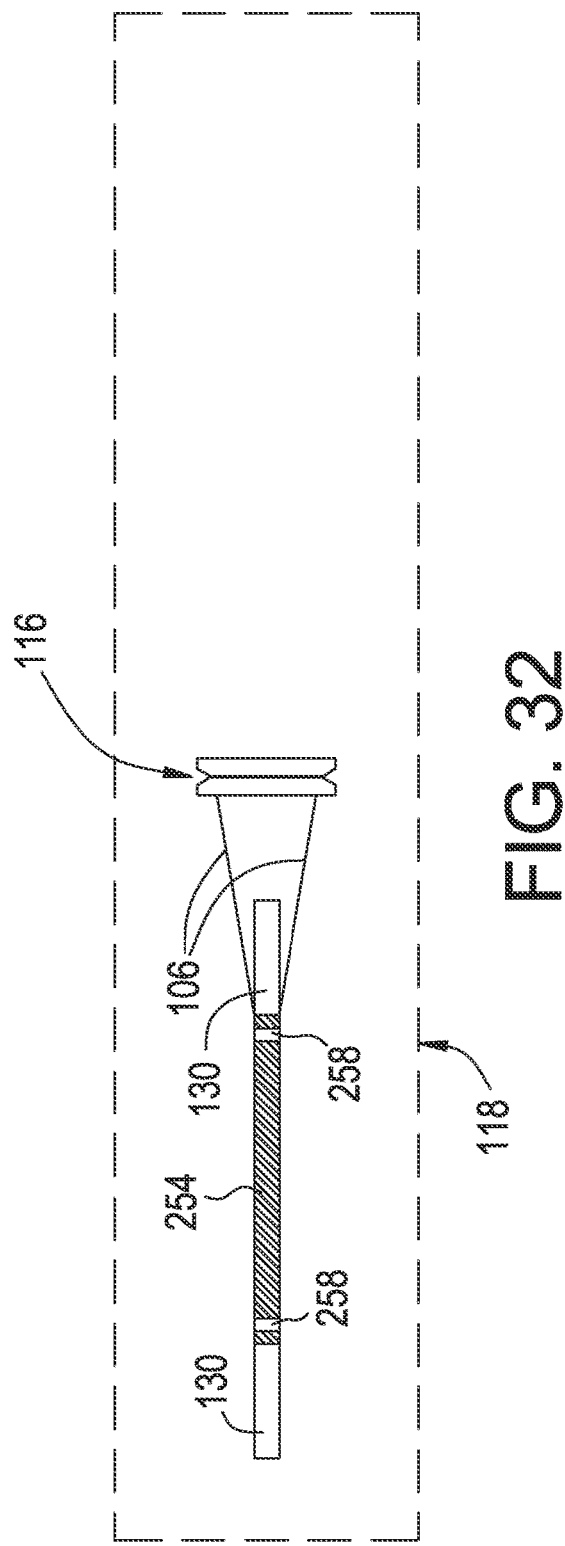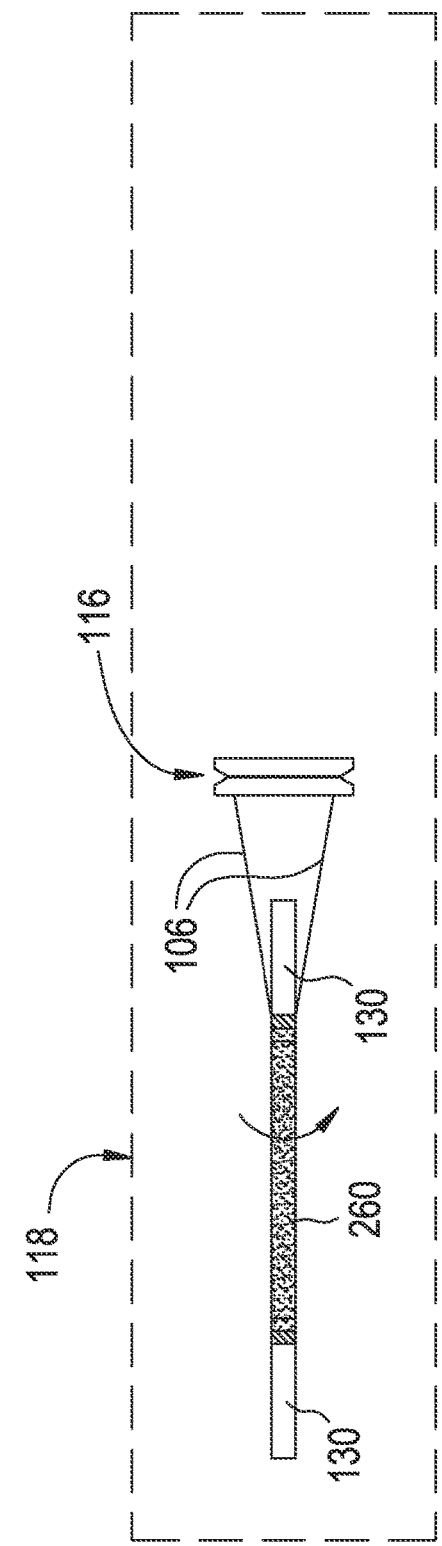

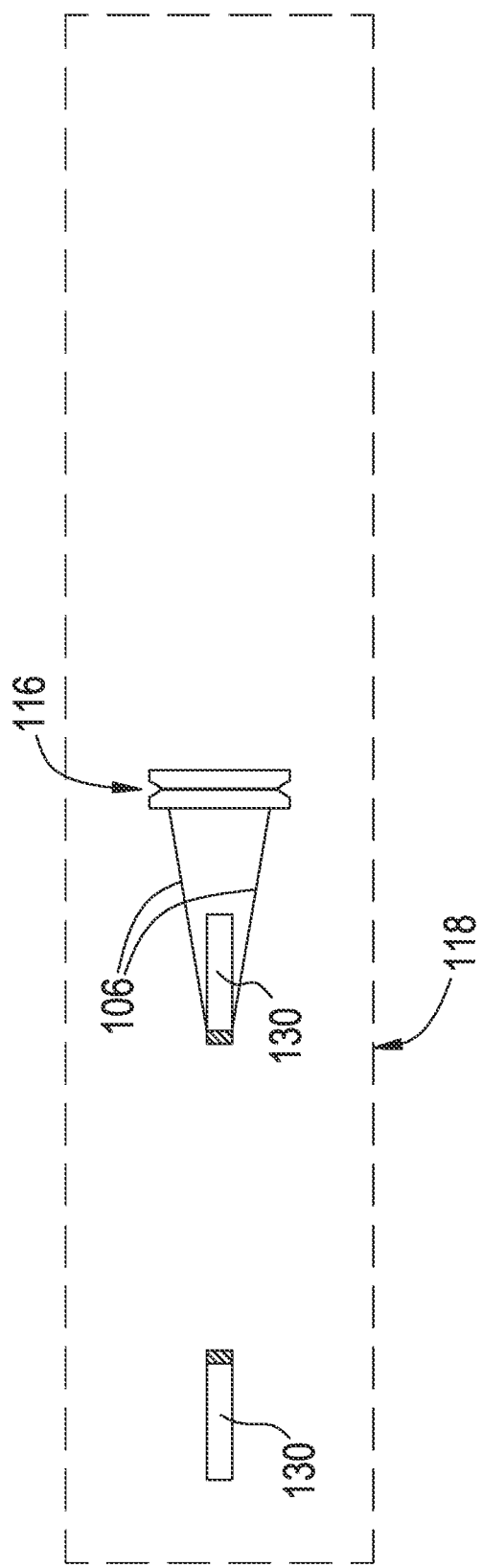

SYSTEMS AND METHODS OF MANUFACTURING FLEXIBLE SPRING MEMBERS FOR GAS SPRING ASSEMBLIES

This application is a continuation of U.S. Nonprovisional patent application Ser. No. 15/476,002 filed on Mar. 31, 2017, which claims the benefit of U.S. Provisional Patent Application No. 62/316,855, filed on Apr. 1, 2016, the contents of each are hereby incorporated herein by reference in their entireties.

BACKGROUND

The subject matter of the present disclosure broadly relates to the art of spring devices and, more particularly, to systems and methods of manufacturing flexible spring members having an approximately uniform spacing and/or configuration of reinforcing cords embedded therein to form a so-called "seamless" construction. Flexible spring members including such a seamless configuration of reinforcing cords as well as gas spring assemblies including such flexible spring members are also included.

The subject matter of the present disclosure is capable of broad application and use in connection with the manufacture of a variety of reinforced elastomeric articles having a generally annular construction. In some cases, the subject matter of the present disclosure may find particular application and use in conjunction with the manufacture of flexible spring members for gas spring assemblies, and will be described herein with particular reference thereto. However, it is to be recognized and appreciated that the subject matter of the present disclosure is amenable to use in connection with other applications and environments without departing from the subject matter of the present disclosure and that application and use described herein should not be interpreted as limiting.

Wheeled motor vehicles of most types and kinds include a sprung mass, such as a body or chassis, for example, and an unsprung mass, such as two or more axles or other wheel-engaging members, for example, with a suspension system disposed therebetween. Typically, such a suspension system will include a plurality of spring devices as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In some cases, the spring devices of vehicle suspension systems will include springs that utilize pressurized gas as the working medium of the devices. Typically, such gas spring assemblies include a flexible spring member that is operatively connected between comparatively rigid end members to form a spring chamber. Conventional flexible spring members are constructed from two layers or plies of reinforcing "fabric" that are formed from multiple reinforcing cords encapsulated in an elastomeric material. Typically, the reinforcing fabric is wrapped around a building mandrel or drum such that opposing edges of the reinforcing fabric form a seam in which one or more reinforcing cords along one edge overlap one or more reinforcing cords along the opposing edge. Where two or more plies or reinforcing fabric are used, a corresponding number of two or more seams are normally formed within a conventional spring member.

It has been recognized that conventional constructions of flexible spring members that have one or more overlapping seams can be generally disadvantageous in certain applications and/or conditions of use. For example, the overlapping edges of the reinforcing plies can result in certain portions of the flexible spring member having an increased thickness in comparison with other portions of the flexible spring member. Such an increased thickness can alter the flexibility and/or other performance characteristics of the flexible spring member, which can be disadvantageous in certain applications and/or under certain conditions of use. Additionally, such seams generally result in an asymmetric construction that can alter the torsional balance of the flexible spring members, which can be disadvantageous in certain applications and/or under certain conditions of use.

Notwithstanding the widespread usage and overall success of the wide variety of conventional systems and methods for manufacturing flexible spring members that are known in the art, it is believed that a need exists to address the foregoing and/or other challenges while providing comparable or improved performance, ease of manufacture, reduced cost of manufacture, and/or otherwise advancing the art of gas spring devices.

BRIEF SUMMARY

One example of system in accordance with the subject matter of the present disclosure can be configured to at least partially manufacture flexible spring members dimensioned for forming associated gas spring assemblies. The system can include a creel assembly supporting a plurality of spools containing at least one cord having an indeterminate length such that a plurality of cords are supported on the creel assembly. A tensioner assembly can be spaced apart from the creel assembly and can be operative to tension approximately equal predetermined lengths of the plurality of cords received from the creel assembly. A building mandrel can be disposed in spaced relation to the tensioner assembly. The building mandrel can be supported for rotation about a longitudinal axis and translation along the longitudinal axis. A head assembly can be supported in fixed relation to the building mandrel. The head assembly can include an opening extending therethrough and can be positioned co-axially relative to the building mandrel such that the building mandrel passes through the opening in the head assembly during translation along the longitudinal axis. The head assembly can be operative to position and redirect the plurality of cords onto the building mandrel during translation and rotation thereof relative to the head assembly.

One example of a method of manufacturing a flexible spring member in accordance with the subject matter of the present disclosure can at least partially form a flexible spring member that is dimensioned for use in forming a gas spring assembly. The method can include providing a plurality of cords having an indeterminate length. The method can also include tensioning approximately equal predetermined lengths of the plurality of cords. The method can further include directing the plurality of cords in a radially inward direction through a head assembly that is disposed in a fixed position. The method can also include securing a first end of the plurality of cords along a building mandrel that is rotatable about a longitudinal axis and translatable through the head assembly along the longitudinal axis. The method can further include applying a first layer of elastomeric material along the building mandrel. The method can also include rotating the building mandrel in a first rotational direction about the longitudinal axis and translating the building mandrel along the longitudinal axis in a first translational direction relative to the head assembly to tow at least a portion of the predetermined lengths of the plurality of cords through the head assembly and wrap at least the portion of the predetermined lengths of the plurality of cords along the first layer of elastomeric material to form a first reinforcing layer.

One example of a method of assembling a gas spring assembly in accordance with the subject matter of the present disclosure can include providing first and second end members. The method can also include providing a flexible spring member that is at least partially manufactured by the foregoing method. The method can further include securing the flexible spring member to the first and second end member such that a substantially fluid-tight seal is formed therebetween to at least partially define a spring chamber.

One example of a flexible spring member in accordance with the subject matter of the present disclosure can be at least partially manufactured by a method according to the foregoing paragraph.

One example of a gas spring assembly in accordance with the subject matter of the present disclosure can include a first end member and a second end member disposed in spaced relation to the first end member. A flexible spring member at least partially manufactured by a method according to the foregoing paragraph can be operatively connected between the first and second end members such that a substantially fluid-tight seal is formed therebetween to at least partially define a spring chamber.

BRIEF DESCRIPTION OF THE DRAWINGS

FIGS. 24-34 include a representation of the exemplary winding machine and cord winding comb head assembly illustrating one example of a method of manufacturing a flexible spring member in accordance with the subject matter of the present disclosure.

DETAILED DESCRIPTION

Figure 1:
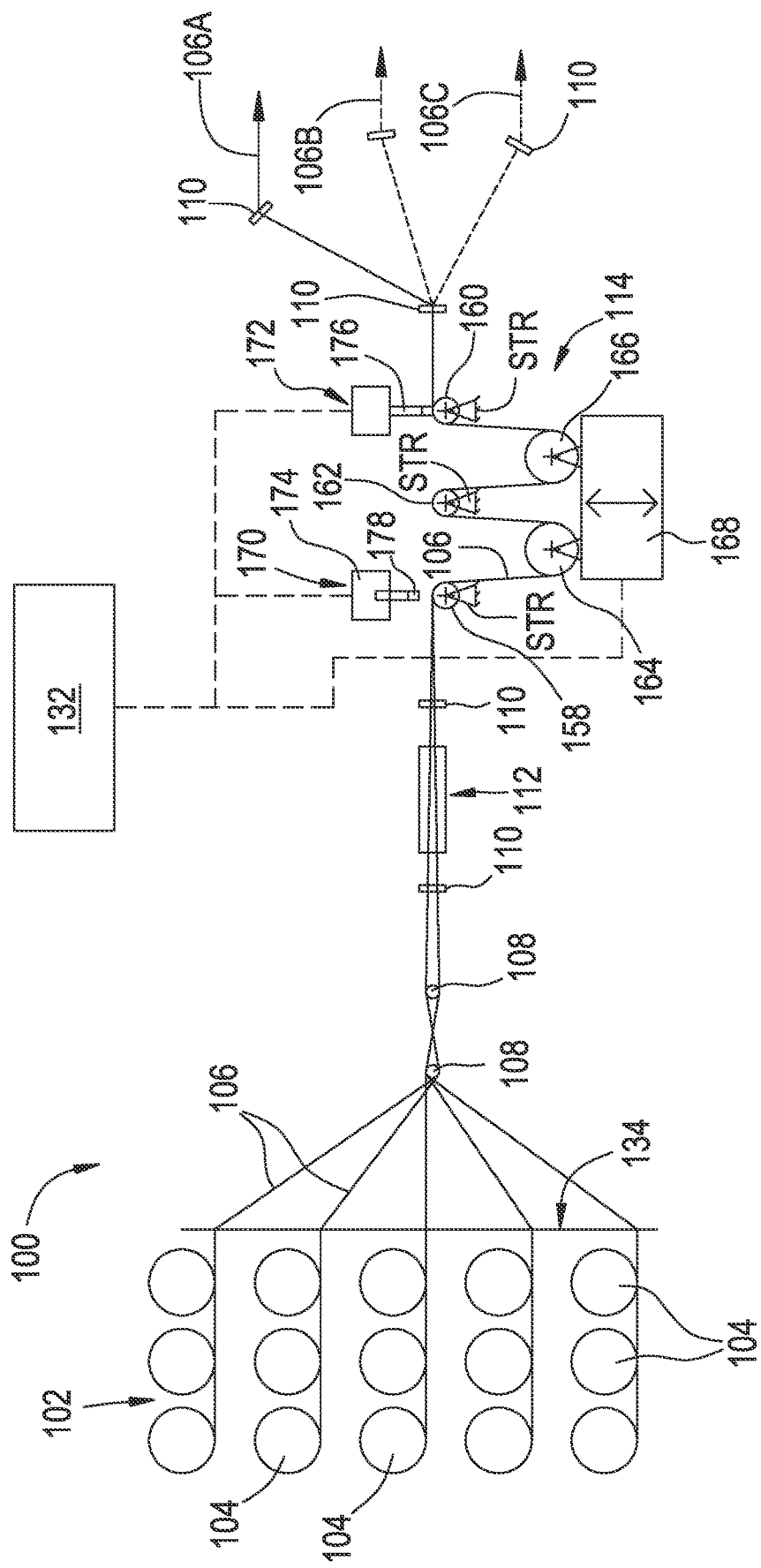
FIGS. 1 and 2 include a representation of one example of a system in accordance with the subject matter of the present disclosure for at least partially manufacturing a flexible spring member with a seamless reinforcing ply construction.

As used herein, terms such as "cord" and the like, are used in reference to the product of one or more filaments, fibers and/or yarns that may be laid, twisted or otherwise bundled together in a continuous, elongated strand of indefinite length. Exemplary cord materials can include polyamide, aramid and polyester. It will be appreciated, however, that other cord materials can also be used and that the foregoing materials are not intended to be limiting. In some cases, the one or more yarns may be treated with a binder, adhesive and/or matrix material such as may be useful to promote adhesion with the elastomeric material within which the cords will be embedded.

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Broadly, the subject matter of the present disclosure relates to the overall construction methods, equipment features and functions, as well as component characteristics associated with seamless reinforcement of flexible (i.e., elastomeric) spring members for gas spring assemblies. As used herein, terms such as "seamless", and the like, are used in reference to flexible spring members for gas spring assemblies that include helically wrapped reinforcement cords that do not include overlapping edges, particularly those that may extend in an axial or helical direction to form one or more seams.

As discussed above, typical bias ply flexible spring members are constructed from one or more plies or layers that use woven reinforcing cords that are encapsulated in elastomeric material (e.g., calendared gum rubber). Such reinforcing cord and elastomeric material assemblies are commonly referred to in the art as "fabric". In conventional constructions, the fabric will typically have a two (2) to four (4) cord overlap splice. As discussed above, there are various disadvantages that may be associated with certain applications and/or under certain conditions of use.

A seamless manufacturing process in accordance with the subject matter of the present disclosure eliminates the cord overlap splice by applying the reinforcement cord through a direct winding process instead of using calendared fabric. Generally, a seamless manufacturing process will produce flexible spring members, which can be in the form of elongated sleeves, for example, that are constructed as follows: (1) an axially spliced sheet of elastomeric material (e.g., calendared gum rubber), which is typically called an inner liner; (2) a non-overlapping layer of helically wrapped reinforcement cord; (3) an axially spliced sheet of elastomeric material (e.g., calendared gum rubber), which is typically called a friction ply; (4) a non-overlapping layer of helically wrapped reinforcement cord with an approximately equal but opposite bias angle to the first layer of reinforcing cords; and (5) an axially spliced sheet of elastomeric material (e.g., calendared gum rubber), which is commonly called a cover ply. It will be appreciated by those of skill in the art that at least the spliced sheets of elastomeric material (e.g., the inner liner, the friction ply and/or the cover layer) will, when vulcanized or otherwise cured, become seamless, integrally-formed layers of elastomeric material.

Figure 2:
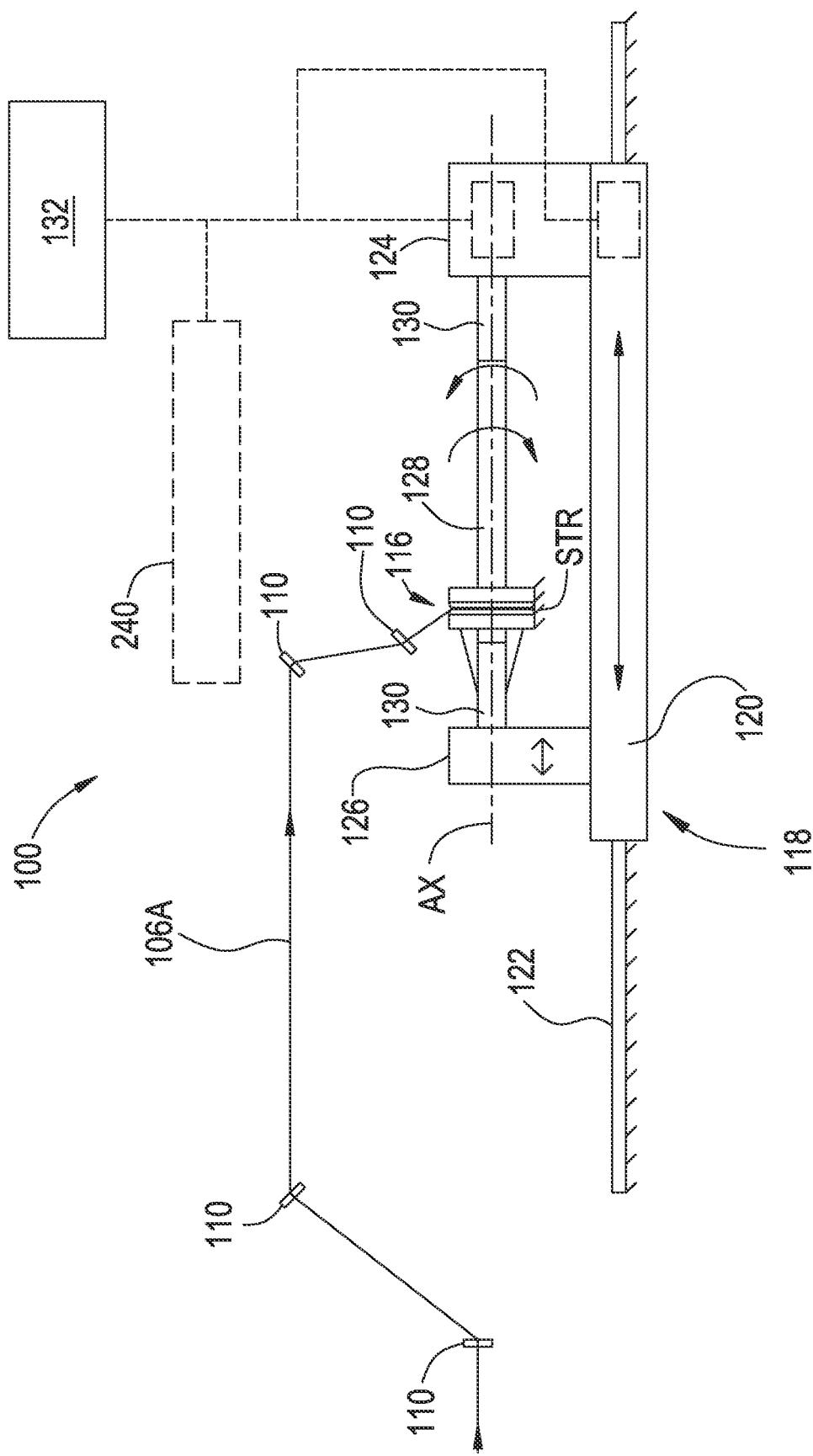
Figure 3:
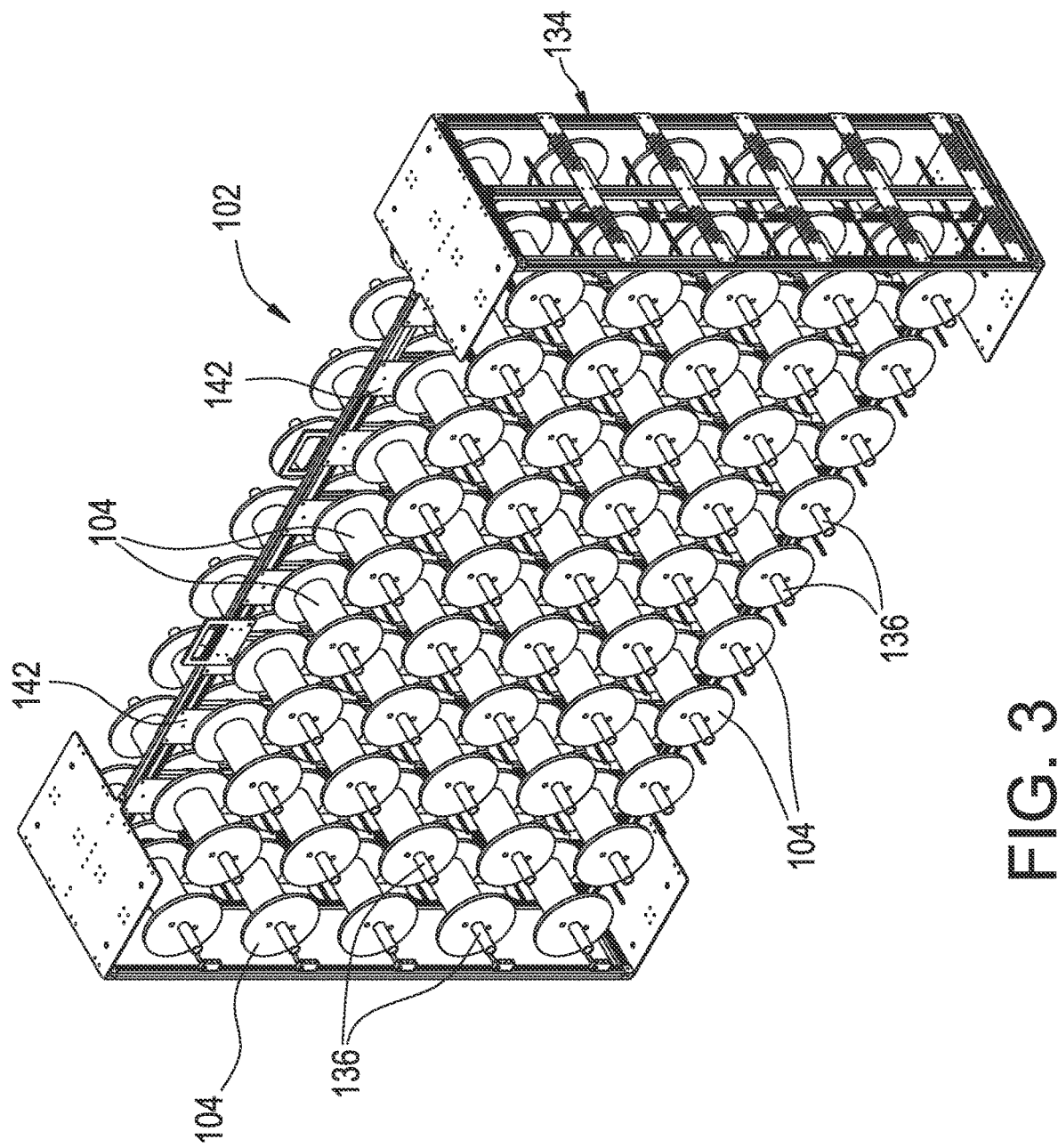
FIG. 3 is a top perspective view of one example of a creel assembly in accordance with the subject matter of the present disclosure.
Figure 4:
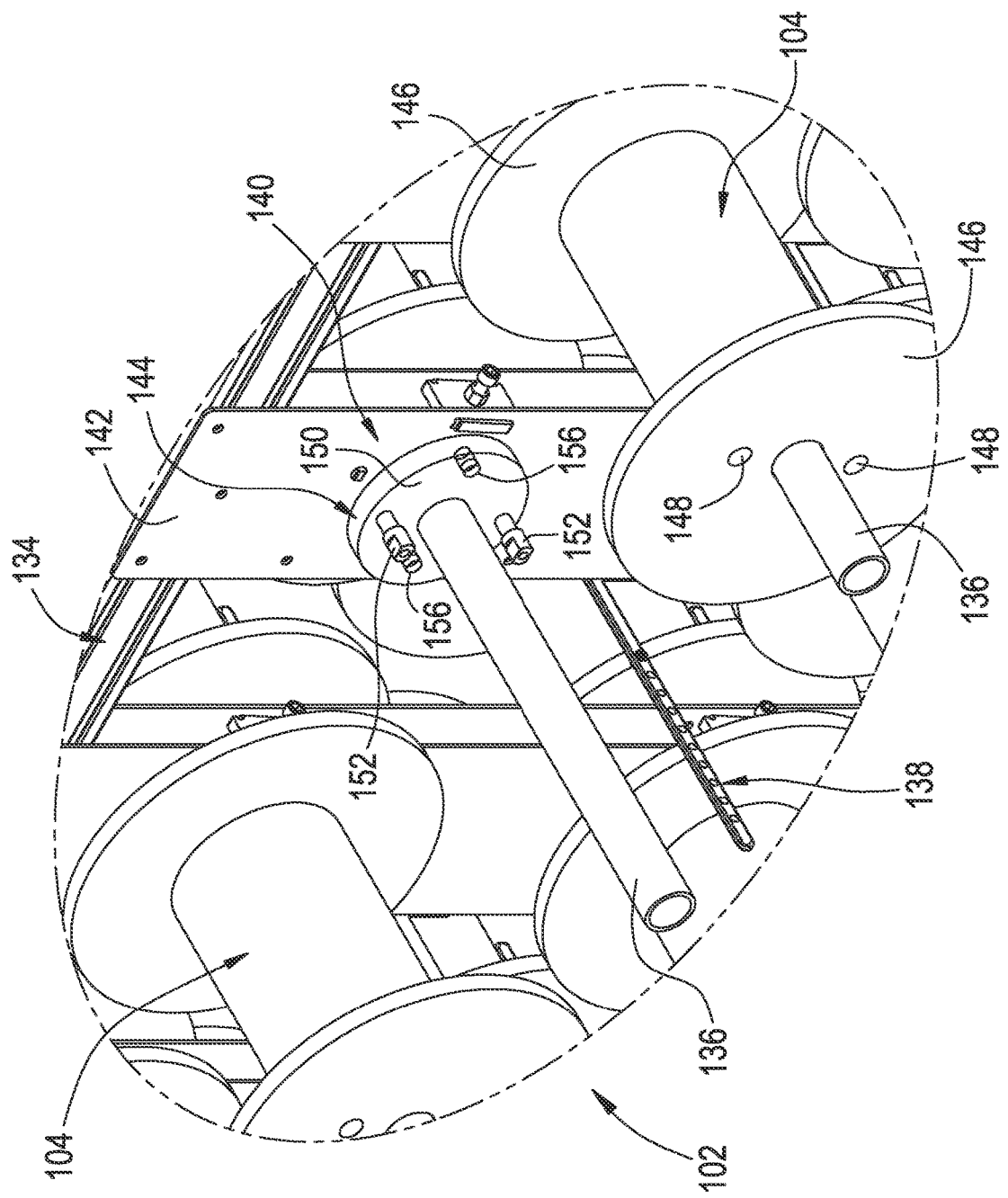
FIG. 4 is an enlarged view of a portion of the exemplary creel assembly in FIG. 3 with a spool removed to show the underlying components.
Figure 5:
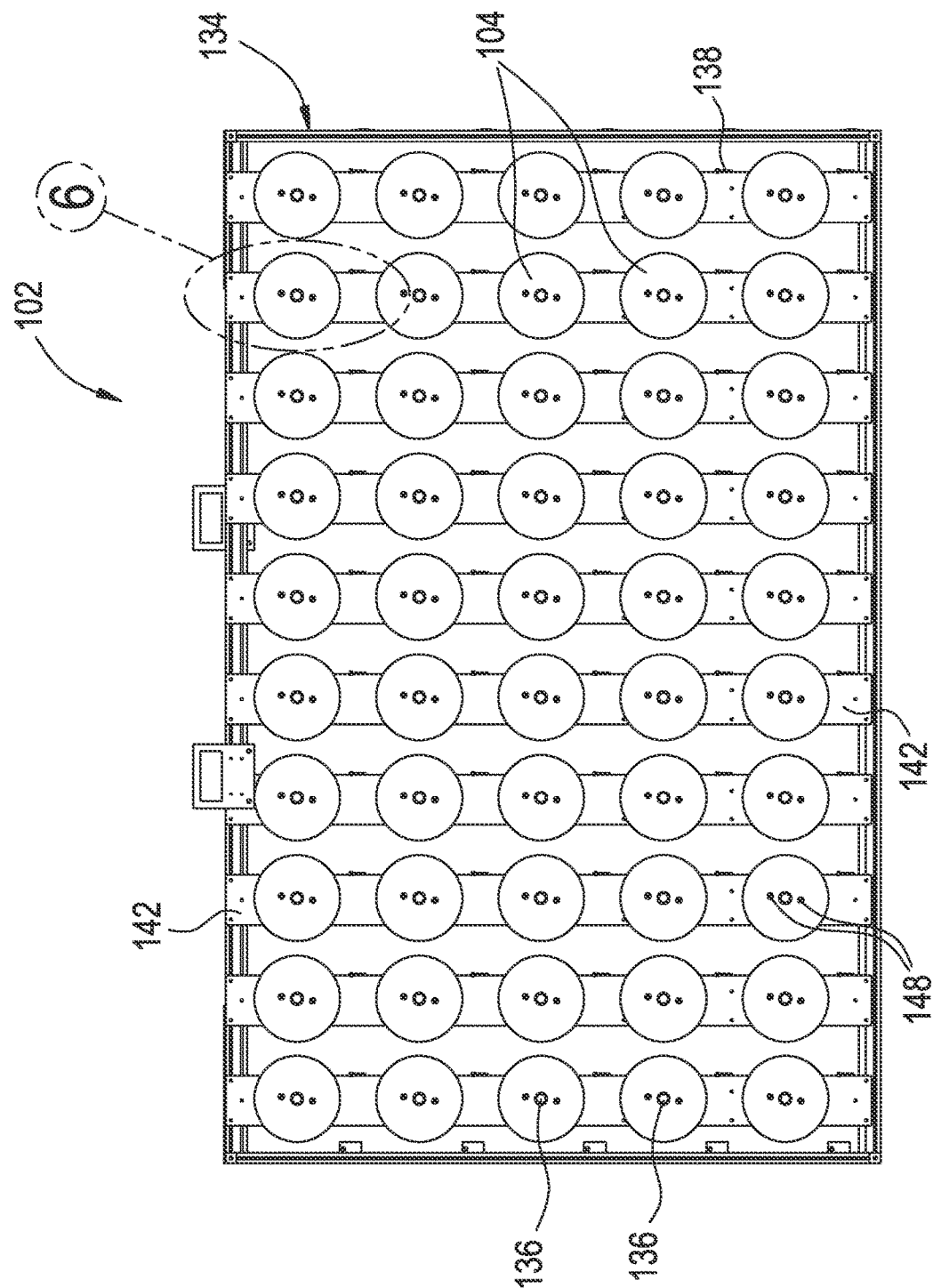
FIG. 5 is a front elevation view of the exemplary creel assembly in FIGS. 3 and 4.
Figure 6:
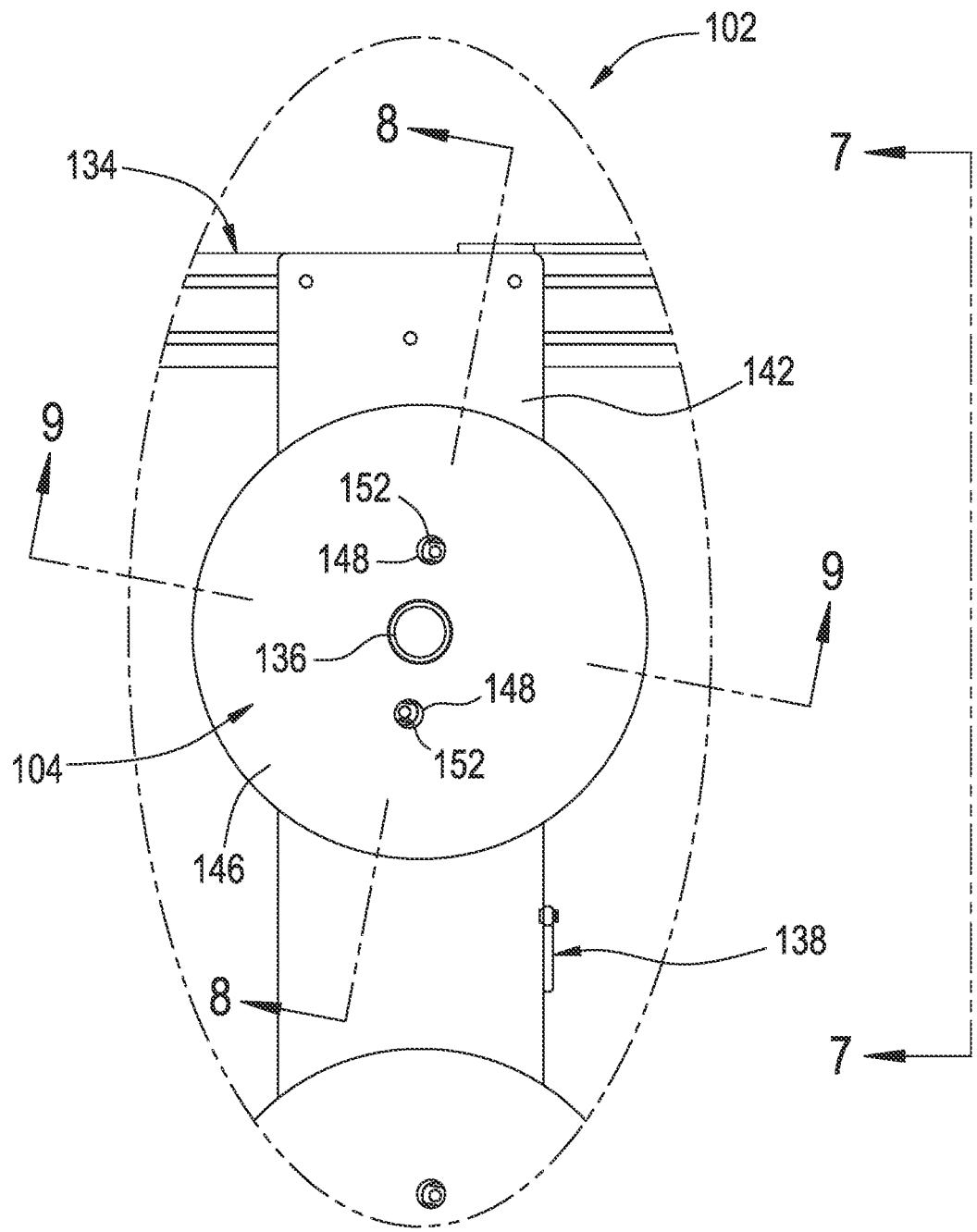
FIG. 6 is an enlarged view of the portion of the exemplary creel assembly in FIGS. 3-5 identified as Detail 6 in FIG. 5.
Figure 7:
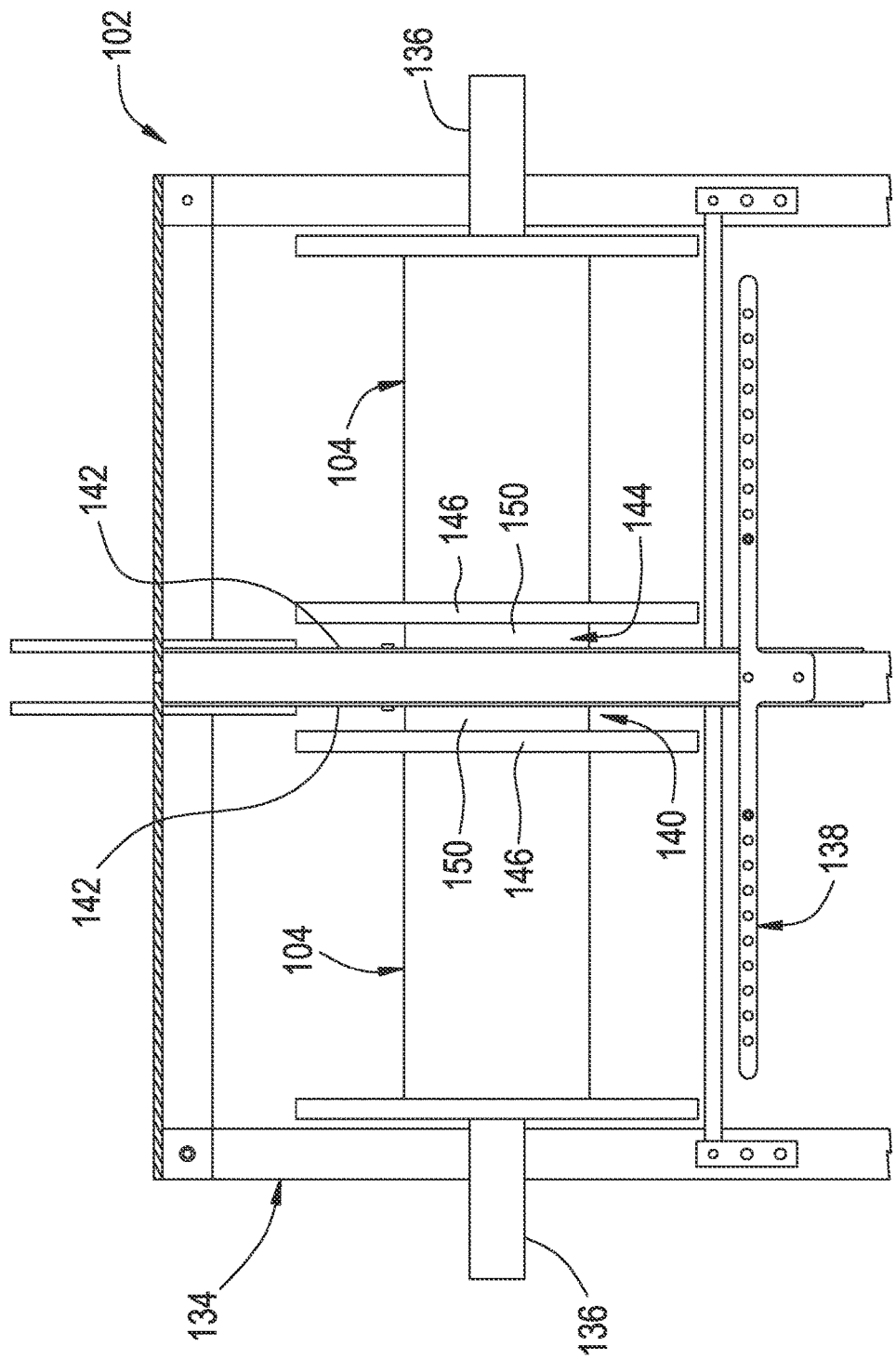
FIG. 7 is a side elevation view, in partial cross-section, of the exemplary creel assembly in FIGS. 3-6 taken from along line 7-7 in FIG. 6.
Figure 8:
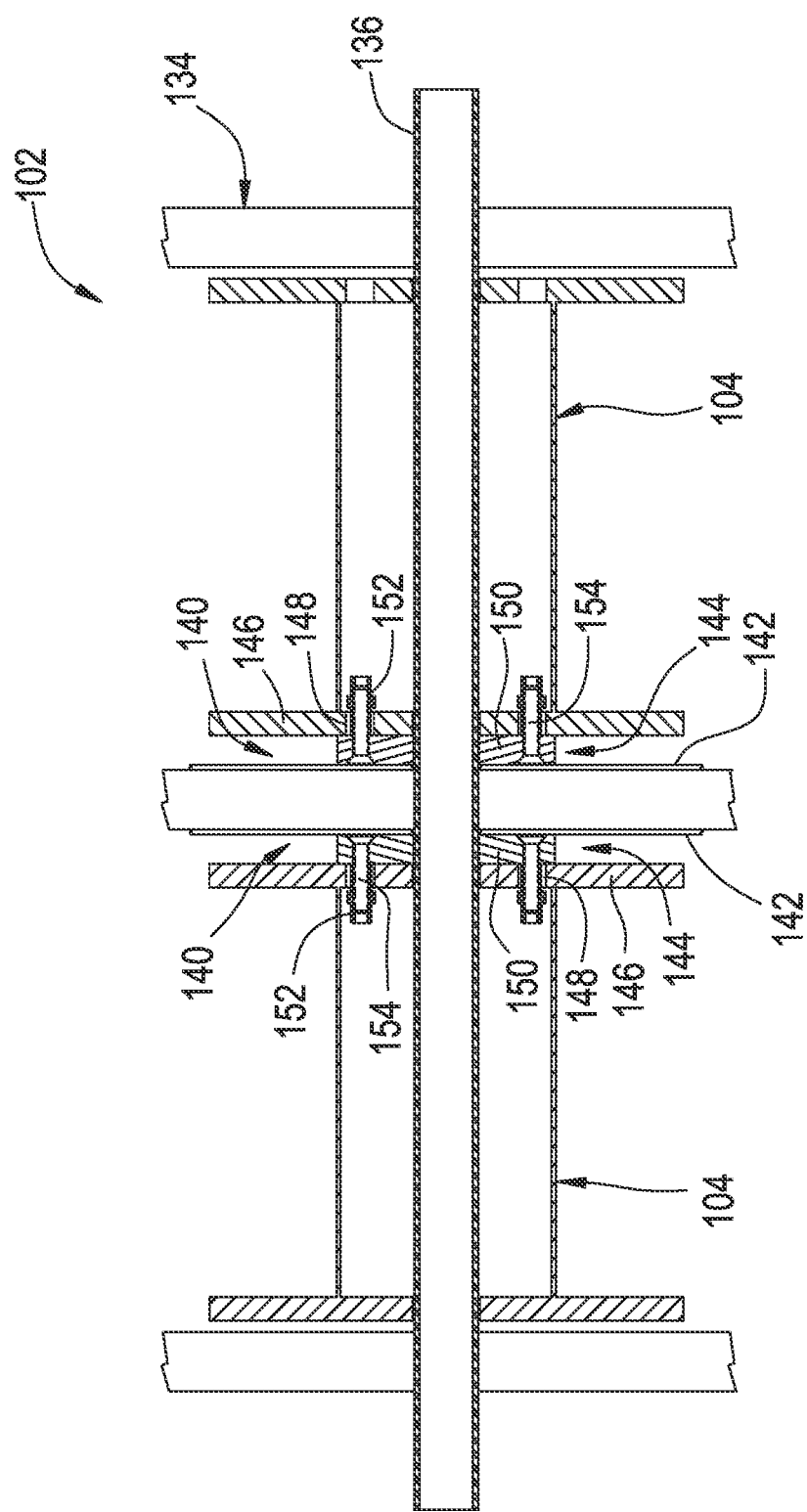
FIG. 8 is a cross-sectional view of the exemplary creel assembly in FIGS. 3-7 taken from along line 8-8 in FIG. 6.
Figure 9:
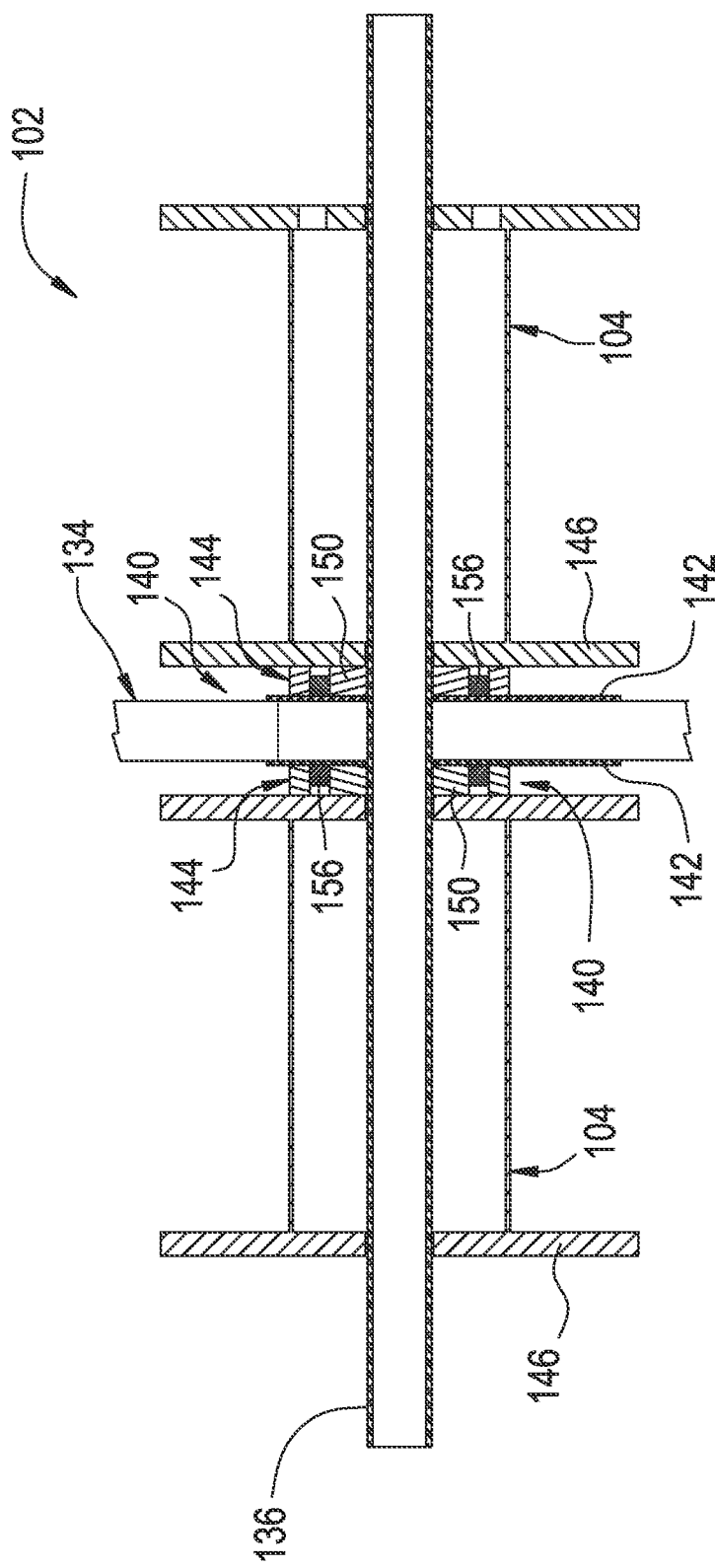
FIG. 9 is a cross-sectional view of the exemplary creel assembly in FIGS. 3-8 taken from along line 9-9 in FIG. 6.

One example of a system 100 that is suitable and operative for use in at least partially performing a seamless manufacturing process for flexible spring members in accordance with the subject matter of the present disclosure is shown in FIGS. 1 and 2. It will be appreciated that system 100 is merely exemplary and that other configurations and/or arrangements could alternately be used. System 100 is shown as including a creel assembly 102 on or along which spools 104 of reinforcing cords 106 can be stored. It will be appreciated that as reinforcing cords 106 are drawn off of spools that are located in different positions on or along creel assembly 102, the reinforcing cords will be advancing from the creel assembly at different angles and orientations. As such, system 100 can include one or more cylinders or guides 108 across which reinforcing cords 106 can be drawn to redirect the reinforcing cords at least approximately into one or more common or at least similar planes.

System 100 can also include one or more cord combs 110 disposed downstream of cylinders 108 to guide and/or support reinforcing cords 106 as the reinforcing cords move away from creel assembly 102. Though optional, it will in many cases be advantageous for system 100 to include a missing or broken cord detector 112. A tensioning system 114 can operatively engage reinforcing cords 106 downstream of creel assembly 102, and can be operative to selectively draw predetermined lengths of reinforcing cords from creel assembly 102. Additionally, tensioning system 114 can be operative to allow the predetermined lengths of reinforcing cord within the tensioning system to be towed or otherwise drawn out of the tensioning system while tensioned or otherwise under load.

Reinforcing cord 106 is drawn out of tensioning system 114 along at least one cord path toward a head assembly 116 (which may also be referred to herein as a cord winding comb head assembly). In a preferred arrangement, at least three cord paths can be used to distribute the reinforcing cords peripherally about head assembly 116, such as are represented in FIG. 1 by cord paths 106A, 106B and 106C. As discussed in greater detail hereinafter, reinforcing cords 106 can extend through multiple cord combs 110 between tensioning system 114 and head assembly 116 to aid in delivering the reinforcing cords to the head assembly with the desired amount of tension in the cords. System 100 also includes a winding machine 118 of which head assembly 116 can sometimes be consider to be a part. Winding machine 118 can include a base 120 that can be supported for translation, such as on or along linear guide rails 122, for example. Winding machine can also, optionally, include a head stock 124 and a tail stock 126 between which a building mandrel 128 can be supported.

Building mandrel 128 can be supported between the head stock and the tail stock in any suitable manner such that the building mandrel can rotate about a longitudinal axis AX. In some cases, winding machine 118 can, optionally, include support spindles 130 that are operatively connected to head stock 124 and tail stock 126. In some cases, the support spindles, which may alternately be referred to herein as "dummy mandrels", can be rotationally disconnected from building mandrel 128 while continuing to support the building mandrel between head stock 124 and tail stock 126. In which case, it will be appreciated that building mandrel 128 would be rotatable while support spindles 130 may remain stationary (i.e., non-rotating).

Additionally, it will be appreciated that various features, components and/or devices of system 100 may be selectively actuated, deactuated or otherwise varied between two or more operational states and/or conditions during use in operation. As such, system 100 can include a control system 132 that can be communicatively coupled with one or more components of tensioning system 114 and/or winding machine 118, such as is shown in FIGS. 1 and 2, for example. It will be appreciated that control system 132 can include any suitable components and/or devices, such as are discussed in greater detail hereinafter, for example.

With reference, now, to FIGS. 3-9, creel assembly 102, spools 104 and reinforcing cords 106 are shown and discussed in greater detail. It will be appreciated that it is believed to be beneficial, such as for production cost and/or quality assurance purposes, for each of the seamless reinforcement layers of a flexible spring member in accordance with the subject matter of the present disclosure to have all of the reinforcement cords applied simultaneously. Depending upon factors such as the size (e.g., diameter), load capacity and certain damping requirements, for example, a flexible spring member can have a number of reinforcement cords within a range of from approximately one hundred (100) to approximately three thousand (3000) individual reinforcement cords applied to the flexible spring member per reinforcement layer. It will be appreciated, then, that a manufacturing process will normally have at least a matching number of cord spools disposed on or along the creel assembly.

Advantageously, creel assembly 102 can be operative to prevent each cord from tangling or rubbing against the other cords as reinforcing cords 106 are dispensed from the respective spools thereof. Additionally, creel assembly 102 can be operative to prevent each of spools 104 from uncontrolled unrolling of reinforcing cords 106. In a preferred arrangement, creel assembly 102 can be modular, with, for example, each creel assembly containing one hundred (100) high capacity cord spools in a matrix configuration with fifty (50) spools on either side of the creel assembly. As one example of a suitable construction, creel assembly 102 can include a creel frame or structure 134 on or along which are supported a plurality of horizontal cantilevered axles or support rods 136. Such a modular creel system allows the resources, floor space demands and other factors to be matched to the requirements of the particular products being manufactured.

To reduce instances of tangling and inadvertent contact of the reinforcing cords with other components, creel assembly 102 can include cord guides 138 that can be supported on or along creel frame 134 in a suitable manner. In this manner, cord guides 138 can align and separate the reinforcing cords as the same are pulled from their respective spools and delivered to the next process.

As discussed above, it may be advantageous to minimize or at least reduce the occurrences of uncontrolled unrolling of the reinforcing cords from spools 104. As such, creel assembly 102 can also incorporate a spool braking system 140 that can operatively engage spools 104 and generate rotational drag to prevent or at least reduce cord tangling due to uncontrolled spool unrolling and contact between loose cords. Spool braking system 140 is shown as including a flat ferrous metal plate 142 that is secured on or along creel frame 134 adjacent support rods 136. A magnetic brake element 144 can be operatively connected to spools 104 in any suitable manner. As one example, spools 104 can have a hub or side wall 146 with one or more holes 148 extending through the side wall. Magnetic brake element 144 can include a polymeric disk element 150 with one or more couplers 152 secured thereto, such as by way of a threaded fastener 154, for example. Couplers 152 can be dimensioned for receipt within holes 148 of side walls 146 of spools 104. In a preferred arrangement, couplers 152 have a larger diameter section that overlaps the inside face of side wall 146 and acts as a horizontal hook to keep the spool from inadvertently sliding off of the coupler during rotation.

Polymeric disk element 150 can be formed from a wear resistant polymeric material, and can operatively engage the cord spool using couplers 152. In some cases, a magnetic force can be used to pull the polymeric disk element and the spool against metal plate 142. The magnetic force can be created by using magnets 156 of a suitable magnetic strength, such as permanent rare earth magnets, that are mounted in polymeric disk elements 150 with one pole of each magnet located a designed offset distance from the surface of metal plate 142. The offset distance of magnets 156 from metal plate 142 together with other factors, such as the magnetic strength of the magnets, the thickness of the flat, ferrous-metal plate and the friction coefficient between the polymeric disk element and the metal plate can all be manipulated to obtain the desired friction force to resist spool rotation.

While creel assembly 102 is intended to be used in conjunction with a separate cord tensioning system, such as tensioning system 114, for example, spool braking system 140 could also be tuned for use as a stand-alone tensioning system to release each cord from its corresponding spool within a range of tensions. This approach to cord tensioning is advantageous because of its cost, simplicity, and synergistic functionality (i.e., tensioning the cord and simultaneously preventing uncontrolled unspooling).

FIGS. 1 and 10-15 illustrate one exemplary configuration for tensioning system 114 as well as one exemplary method of operation suitable for selectively drawing predetermined lengths of reinforcing cords from creel assembly 102 and allowing the predetermined lengths of reinforcing cords within the tensioning system to be towed or otherwise drawn out of the tensioning system while tensioned or otherwise under load. Tensioning system 114 is shown as including an entrance wrap bar 158 and an exit wrap bar 160 that are supported in spaced relation to one another. In a preferred arrangement, wrap bars 158 and 160 are axially co-extensive with one another. In some cases, one or more intermediate wrap bars can be disposed in spaced relation with one another between the entrance and exit wrap bars. For example, an intermediate wrap bar 162 is shown in FIGS. 1 and 10-15. In a preferred arrangement, wrap bars 158, 160 and 162 are supported in fixed position relative to one another, as is represented by structural support STR. Additionally, in a preferred construction, wrap bars 158, 160 and 162, if included, are freely rotatable about the axis of rotation thereof, unless acted on by another component, as described hereinafter.

Tensioning system 114 can also include one or more dancer rollers that are disposed between the entrance and exit wrap bars. In the arrangement shown in FIGS. 1 and 10-15, for example, two dancer rollers 164 and 166 are included with dancer roller 164 disposed between wrap bars 158 and 162, and dancer roller 166 disposed between wrap bars 160 and 162. In a preferred arrangement, dancer rollers 164 and 166 are freely rotating rolls that are operative to apply a controlled load to the reinforcing cords in the tensioning system as the length of the reinforcing cord changes during use in operation, as is represented by arrow MVT indicating movement of actuation load 168. Additionally, tensioning system 114 can include one or more tensioner brakes that can be operatively associated with one or more of wrap bars 158, 160 and/or 162. In the exemplary arrangement shown, tensioning system 114 includes tensioner brakes 170 and 172, which are operatively associated with entrance wrap bar 158 and exit wrap bar 160, respectively. It will be appreciated that tensioner brakes 170 and 172 can be of any suitable type, kind, configuration and/or construction. As one example, tensioner brakes 170 and 172 are shown as including an actuator 174 that is communicatively coupled with control system 132 for selective operation thereof. The tensioner brakes also include an engagement element 176 that is selectively displaced in response to operation of actuator 174 as well as an engagement pad 178 that is dimensioned to abuttingly engage the associated wrap bar. In a preferred arrangement, engagement pad 178 is dimensioned to abuttingly engage the associated one of entrance wrap bar 158 and exit wrap bar 160 such that in an engaged condition the engagement pad substantially inhibits rotation of the associated wrap bar as well as substantially inhibits movement of reinforcing cords 106 across the associated wrap bar.

When wrapping reinforcement cord over an elastomeric substrate on a geometric form, typically a cylinder, the cord tension and stretch are factors that contribute to consistent cord spacing and placement as well as cord penetration into the substrate, dimensional stability of the uncured rubber sleeve (especially if removed from the building form uncured), demolding ease, cured gas spring torsional balance, spring rate, burst pressure, and damping characteristics. Because of the nature of the cord tension and stretch at the point of application, and the desire to cost effectively manufacture seamless flexible spring members with one hundred (100) to three thousand (3000) cords applied simultaneously per reinforcement layer, tensioning system 114 has been developed.

Tensioning system 114 is positioned between creel assemblies 102 (only one of which is shown) and winding machine 118. The continuous reinforcement cords pass from creel assemblies 102 through tensioning system 114 on their way to the winding machine 118. Each cord coming from the creel assemblies will naturally have a tension ranging from 0 (slack) to the breaking strength of the cord. While it is possible to control tension; and to a lesser degree, absolute cord stretch coming from the creel assemblies within a specific range, adjusting and maintaining control is cumbersome and can be prohibitively costly when simultaneously applying large numbers of cords (i.e. 100-3000 cords) when building a flexible spring member. Existing creel tension isolation systems are often only capable to handling up to a few reinforcing cords and can be cost prohibitive when used in connection with large numbers of reinforcing cords. To resolve issues such as tension and stretch control, tensioning system 114 physically isolates the cord tension and stretch from the creel assemblies, and redefines and controls the cord tension and stretch as the reinforcing cords pass through the tensioning system to be consumed during the winding operation.

Reinforcing cords pass through tensioning system 114 from entrance to exit as follows. The reinforcing cords enter the tensioning system from the creel assemblies around the outside surfaces of static cylinders 108. The purpose of cylinders 108 is to bring all the cords onto the system's common cord elevation plane from the higher and lower planes of the creel assemblies. Next, the reinforcing cords pass through cord comb guide 110, which is preferably capable of individually separating each cord from the surrounding cords. The purpose of this and all cord comb guides in system 100 is to keep the reinforcing cords separate and guide the flow thereof to the next operation or cord comb guide without damaging or cord or any dry coating applied to the cord. From here, reinforcing cords 106 pass through detector 112 that is, preferably, operative to detect broken or missing cords, and then through an additional cord comb guide 110. Next, the reinforcing cords will enter the tension loop of tensioning system 114 when they pass between entrance cord brake 170 and free-rotating wrap bar 158. It is noted that one or more of the wrap bars contacting reinforcing cords in the tension loop are preferably free-rotating cylinders. The reinforcing cords then pass under first free-rotating dancer roll 164, over intermediate free-rotating wrap bar 162, under second free-rotating dancer roll 166, and between the exit cord brake 172 and free-rotating wrap bar 160. Finally the cords pass through a final horizontal cord comb guide 110 before being passed to the winding machine.

The tensioning system operates in conjunction with a semi-continuous winding operation. Within the winding operation, the reinforcing cords are consumed in batches, where each batch represents a complete single layer or ply of reinforcement. When tensioning system 114 is initially setup, all of the cords should be anchored to the building form or mandrel, and then all slack can be removed from all cords. Removing slack can be accomplished by consuming cord length at the winding operation or by rewinding cords onto their respective spools in the creel assembly. With the slack removed from the cords, a typical part winding sequence within tensioning system 114 will operate as described hereinafter and shown in connection with FIGS. 10-15.

Figure 10:
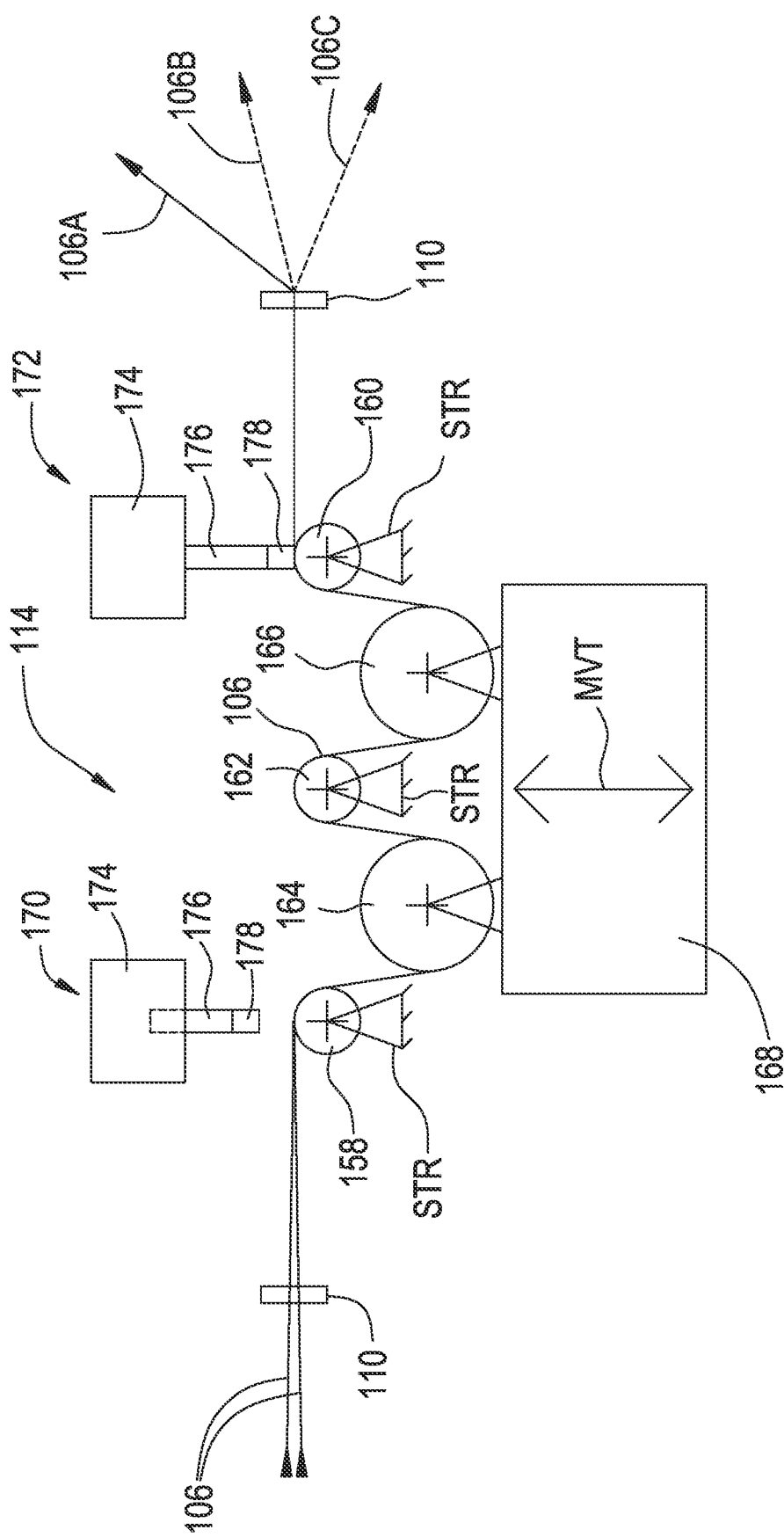
FIGS. 10-15 include a representation of one example of a tensioning system in accordance with the subject matter of the present disclosure, as shown in FIG. 1, and illustrating the operation thereof during the manufacture of a flexible spring member with a seamless reinforcing ply construction.

Initially, as shown in FIG. 10, exit tensioner brake 172 engages to prevent reinforcing cord from exiting the tensioning system. This isolates the cord in the tensioning system from the winding operation. Entrance tensioner brake 170 disengages to allow cord to be pulled into tensioning system 114 from creel assemblies 102.

Figure 11:
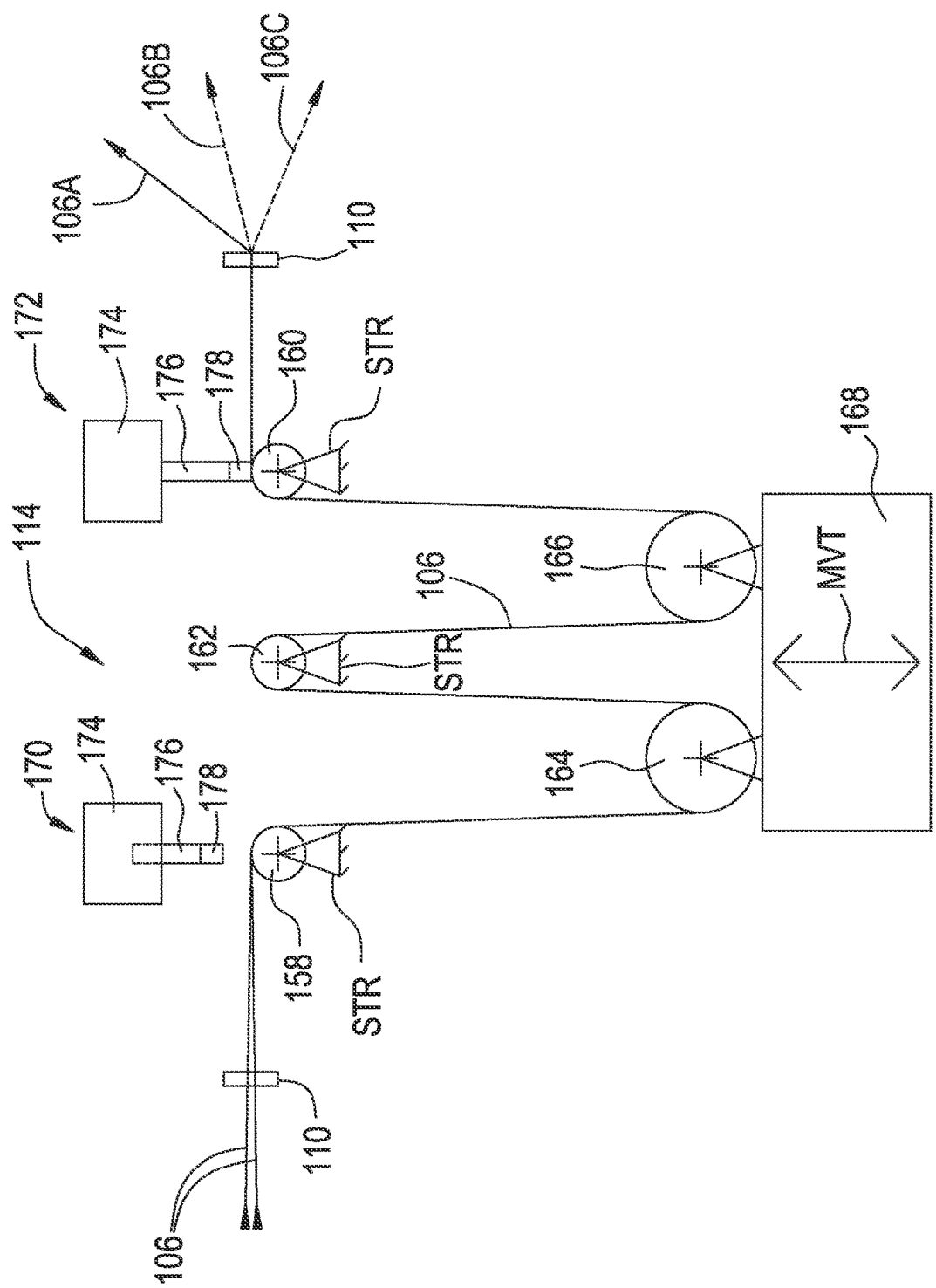
Figure 12:
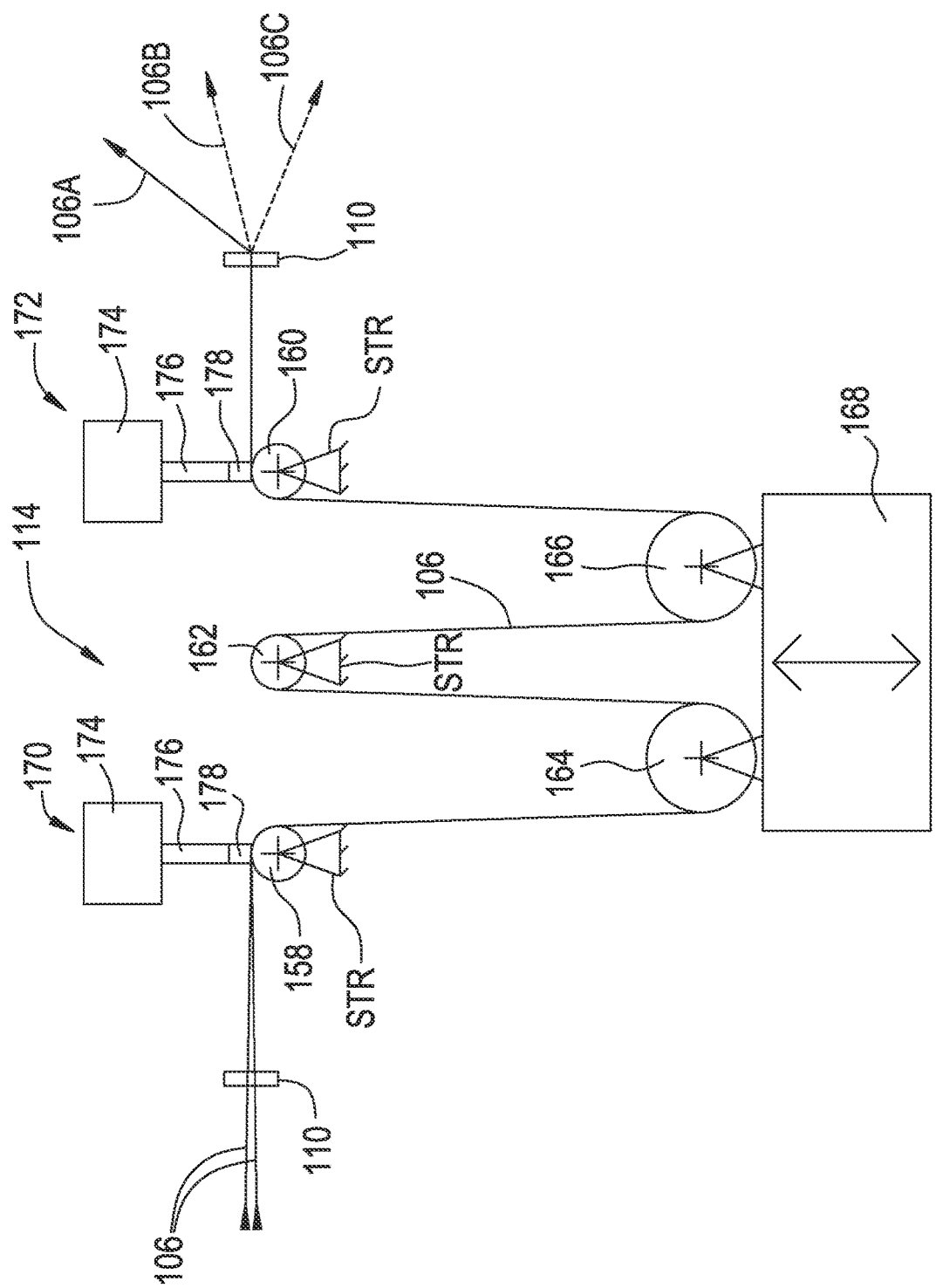
Figure 13:
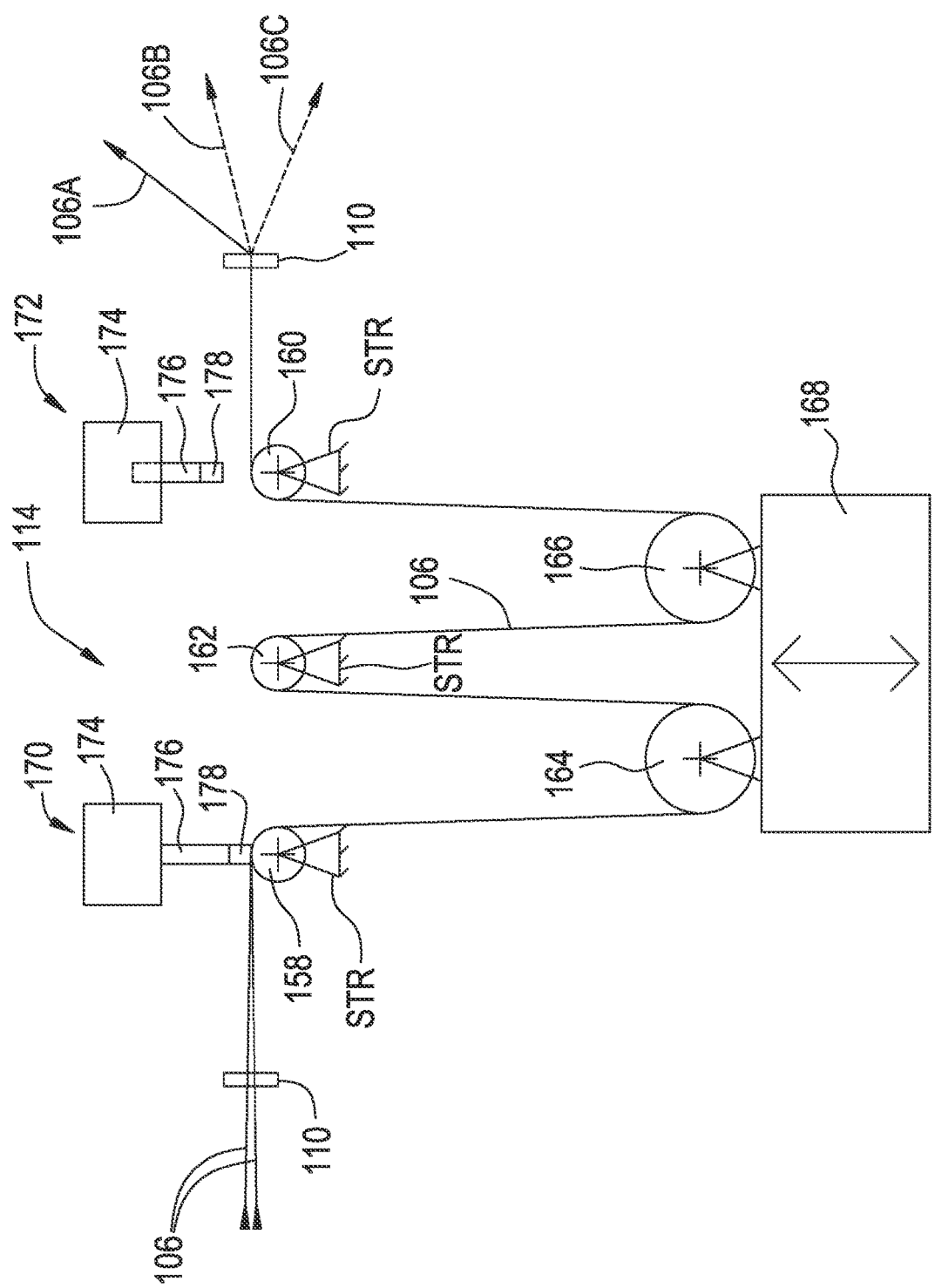

As shown in FIG. 11, dancer rolls 164 and 166 actuate away from the wrap bars 158, 160 and 162 to draw the desired, predetermined lengths of reinforcing cords into a tensioning loop inside tensioning system 114. It will be appreciated that the predetermined lengths of reinforcing cords drawn into the tensioning loop can correspond to any number of one of more winding applications. Upon drawing the desired, predetermined lengths of reinforcing cords into the tensioning loop, entrance tensioner brake 170 engages to isolate the reinforcing cords in the tensioning system from creel assemblies 102, as shown in FIG. 12. Thereafter, exit tensioner brake 172 can disengage to allow consumption of the reinforcing cords in the tensioning system by the winding operation, as shown in FIG. 13.

Figure 14:
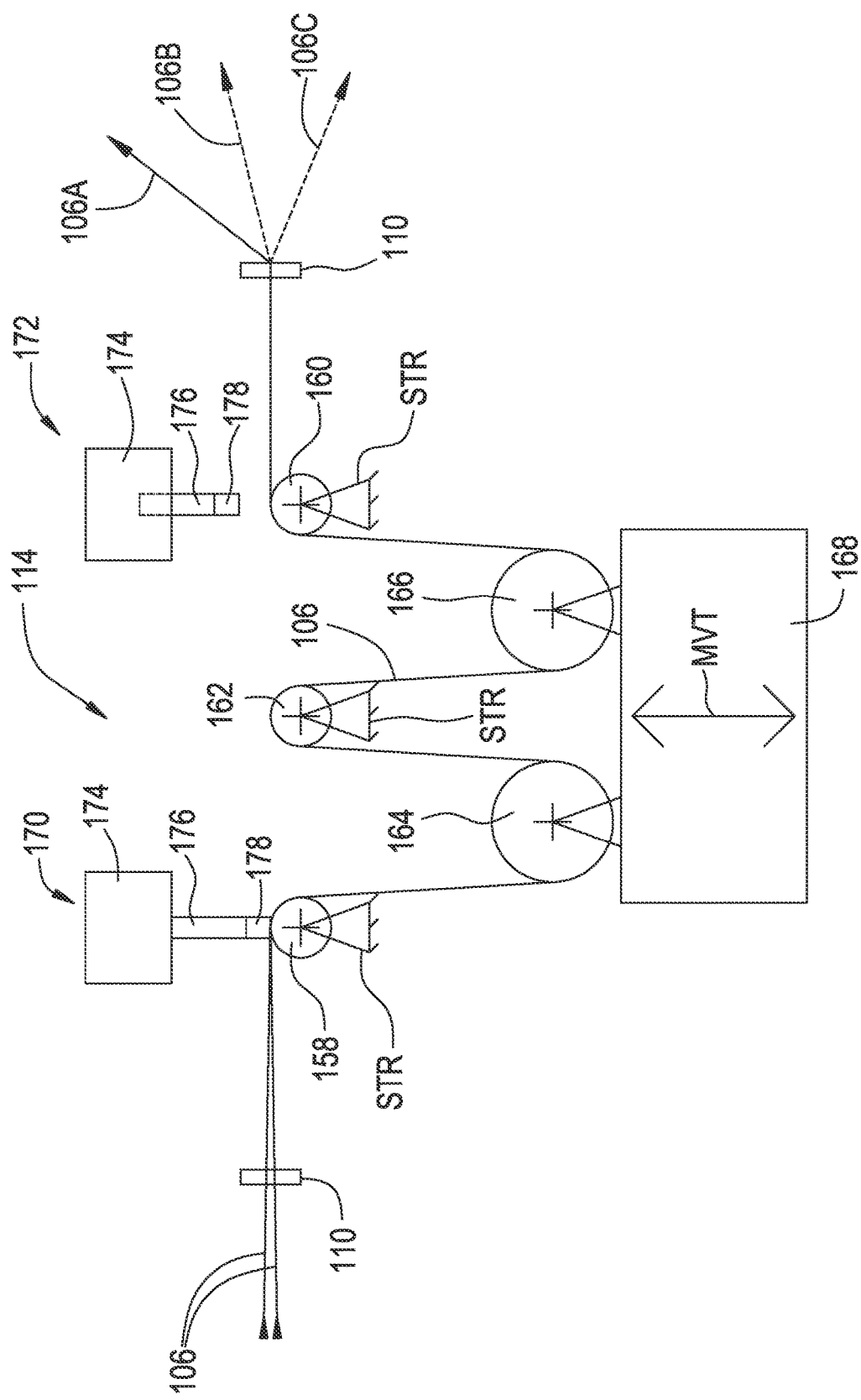
Figure 15:
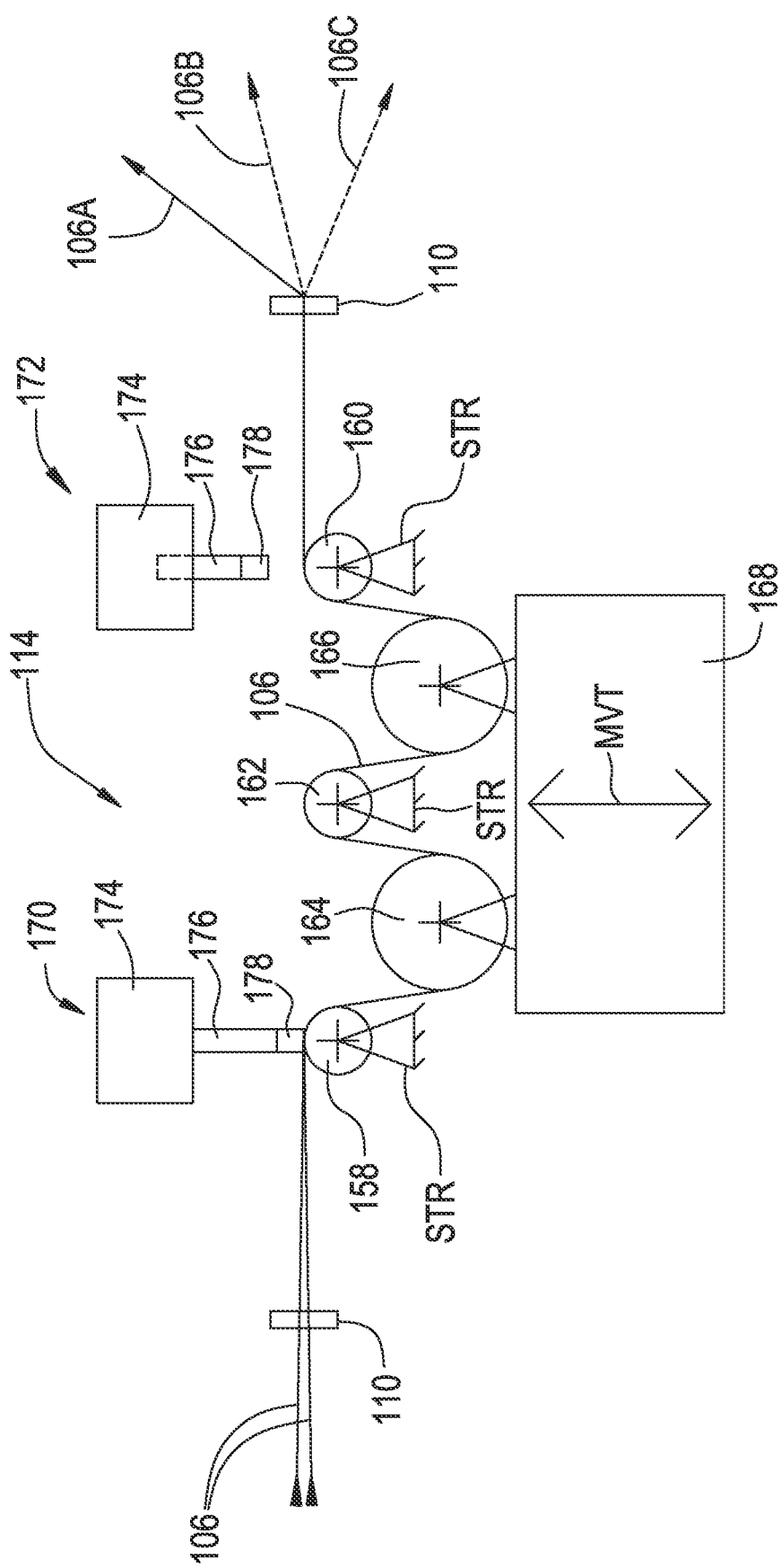

The winding operation consumes the cord and pulls it from the tensioning loop inside the tensioning system. As the cord is consumed, dancer rolls 164 and 166 are pulled closer to wrap bars 158, 160 and 162, such as is shown in FIG. 14. Once all the reinforcing cord in the tensioning loop of the tensioning system is consumed, such as is shown in FIG. 15, for example, the cycle can repeat to reload reinforcing cord into the tensioning loop of tensioning system 114 for the next winding machine consumption event, such as is shown in FIG. 10, for example. While FIGS. 10-15 may suggest that the tensioning loop of tensioning system 114 is sized or otherwise constructed for two tows, it will be recognized and appreciated that any suitable number of tows could be used and that the configuration shown and described herein is merely exemplary.

As discussed above, control system 132 can be communicatively coupled with any one or more features, components and/or systems of system 100. For example, loading, actuation and/or resistance to movement of dancer rolls 164 and 166 can be controlled in an open-loop or closed-loop manner. A typical open-loop force control will use passive force applied to the dancer rolls or a carriage attached to the dancer rolls and directed to keep the dancer rolls separated from the wrap bars. A closed-loop force control system will incorporate load or current sensing of the dancer roll force application equipment, or winding torque measurement, or tension measurements from select reinforcing cords to adjust the position and/or force of the dancer roll force application equipment in real-time.

As discussed above, winding machine 118 is operative to rotate and translate building mandrel 128 through static cord winding comb head assembly (or simply "head assembly") 116. The reinforcing cord coming from tensioning system 114 to the head assembly 116 should be guided to ensure adequate access to building mandrel 128, preferably on both axial sides of the head assembly 116 for rubber application and equipment/operator part interactions. Additionally, adequate space should exist for building mandrel support and translation mechanisms of winding machine 118 to be positioned in a desired manner, such as are represented by clearance windows 180A, 180B and 180C in FIG. 16. It is further desirable for all the reinforcing cords entering head assembly 116 to experience substantially similar cord path history to ensure equal tension when wrapped onto building mandrel 128. Advantageously, equal wrap tension can result in a flexible spring member with torsional balance (considering only cord tension factors).

Figure 16:
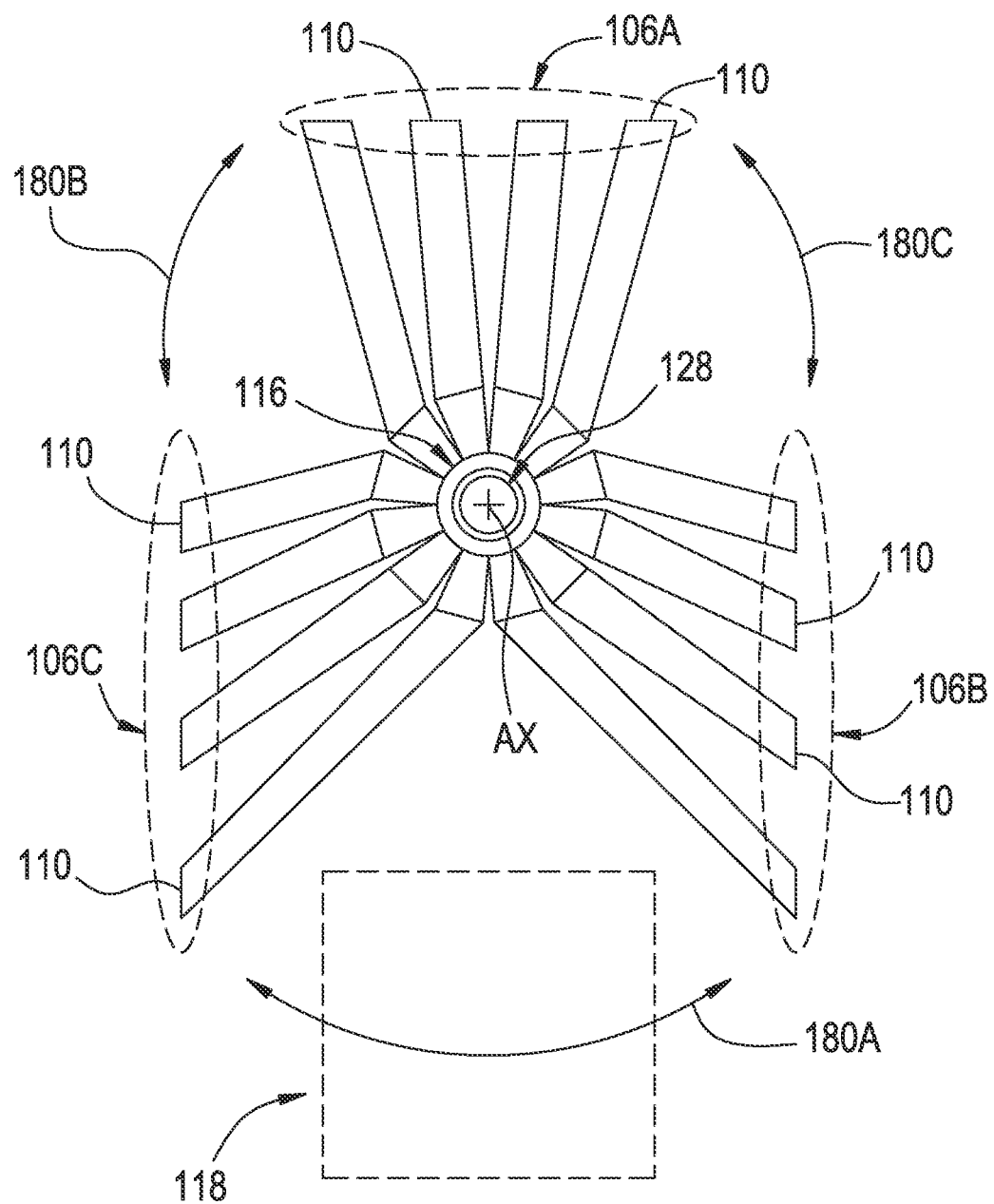
FIG. 16 includes a representation of one exemplary arrangement of cord paths directing reinforcing cords from the exemplary tensioning system in FIGS. 1 and 10-15 to a head assembly in accordance with the subject matter of the present disclosure.
Figure 17:
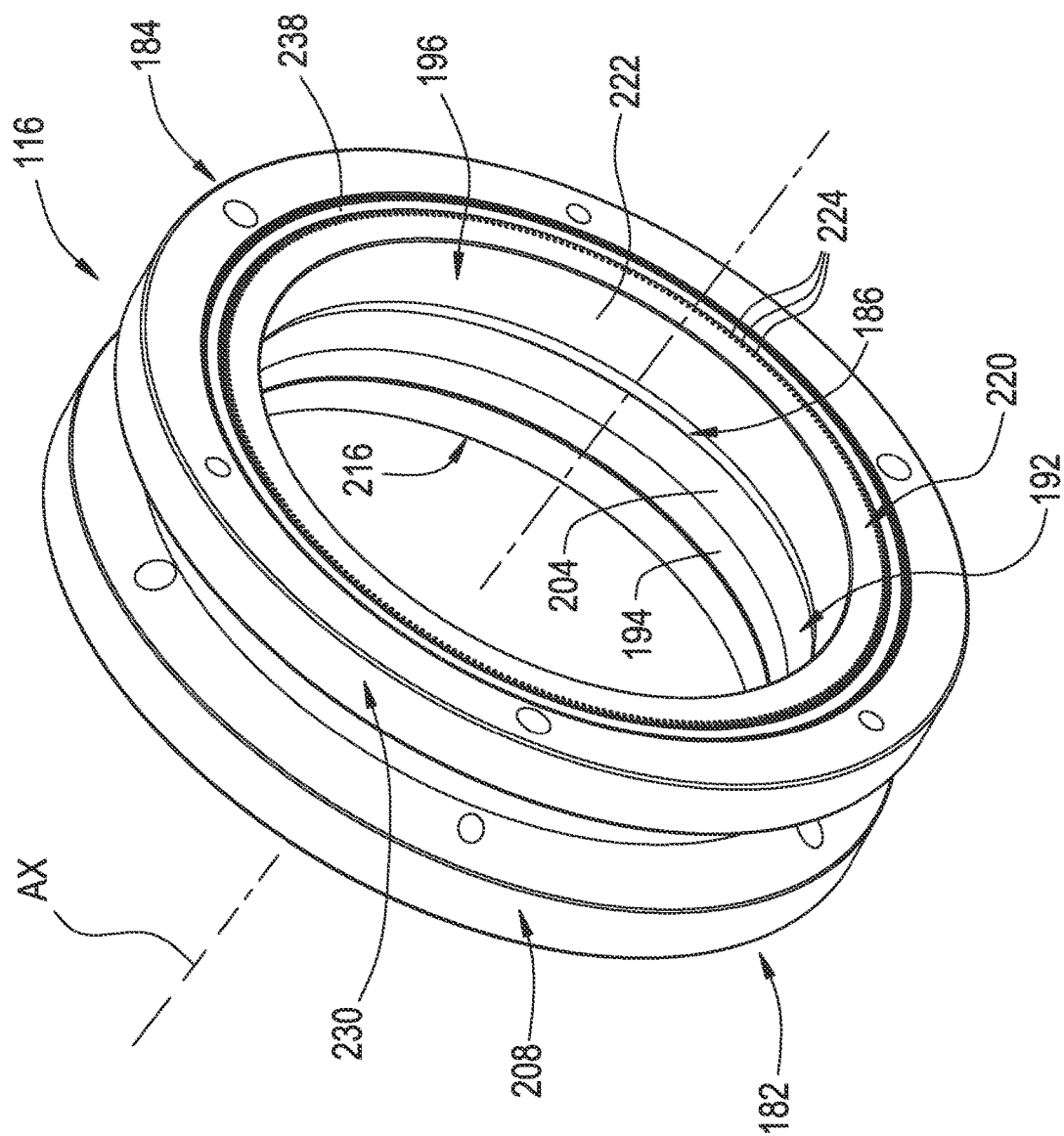
FIG. 17 is a top perspective view of one example of a cord winding comb head assembly in accordance with the subject matter of the present disclosure, such as is shown in use in FIGS. 2 and 16.
Figure 18:
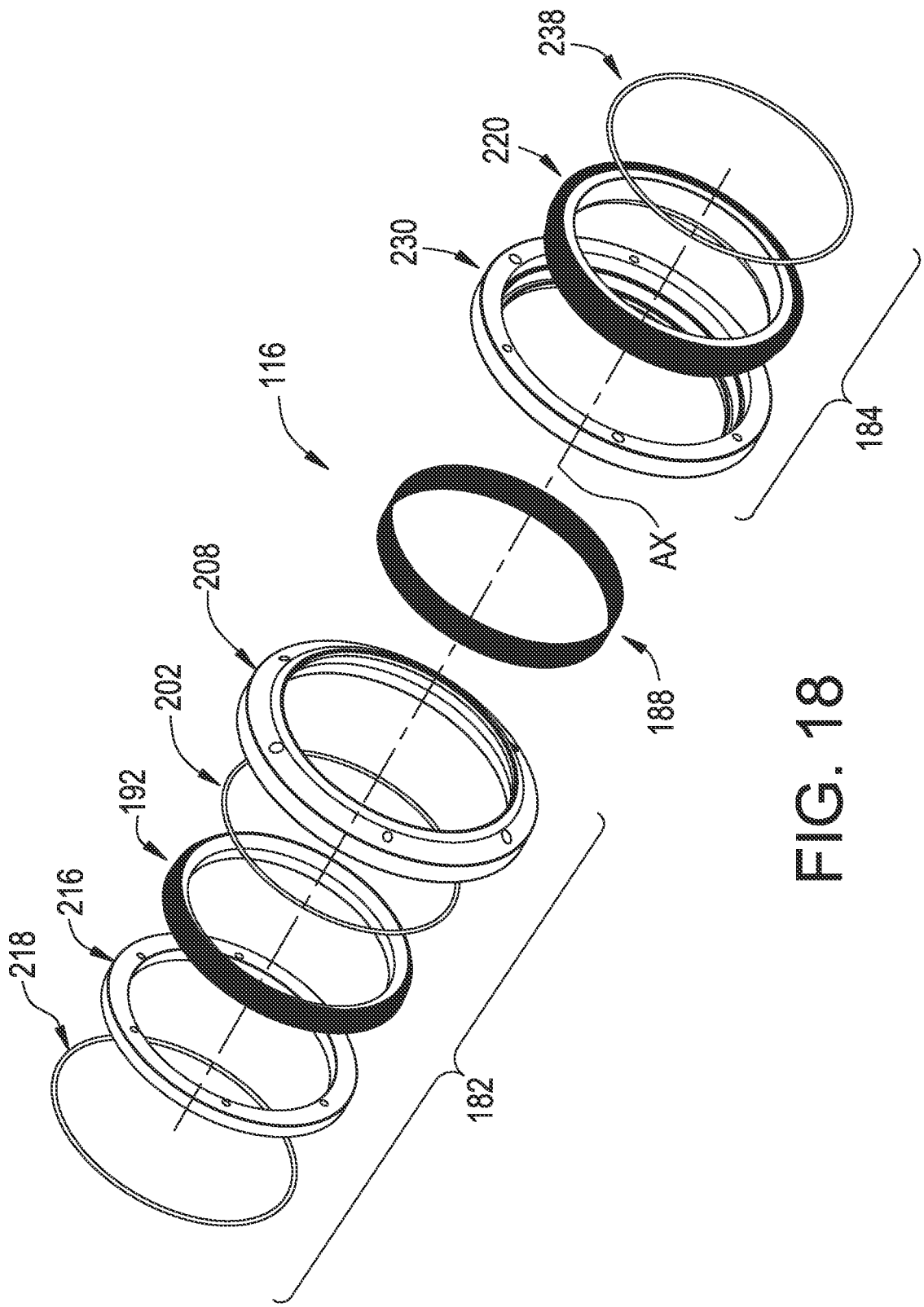
FIG. 18 is an exploded view of the exemplary cord winding comb head assembly in FIG. 17.
Figure 19:
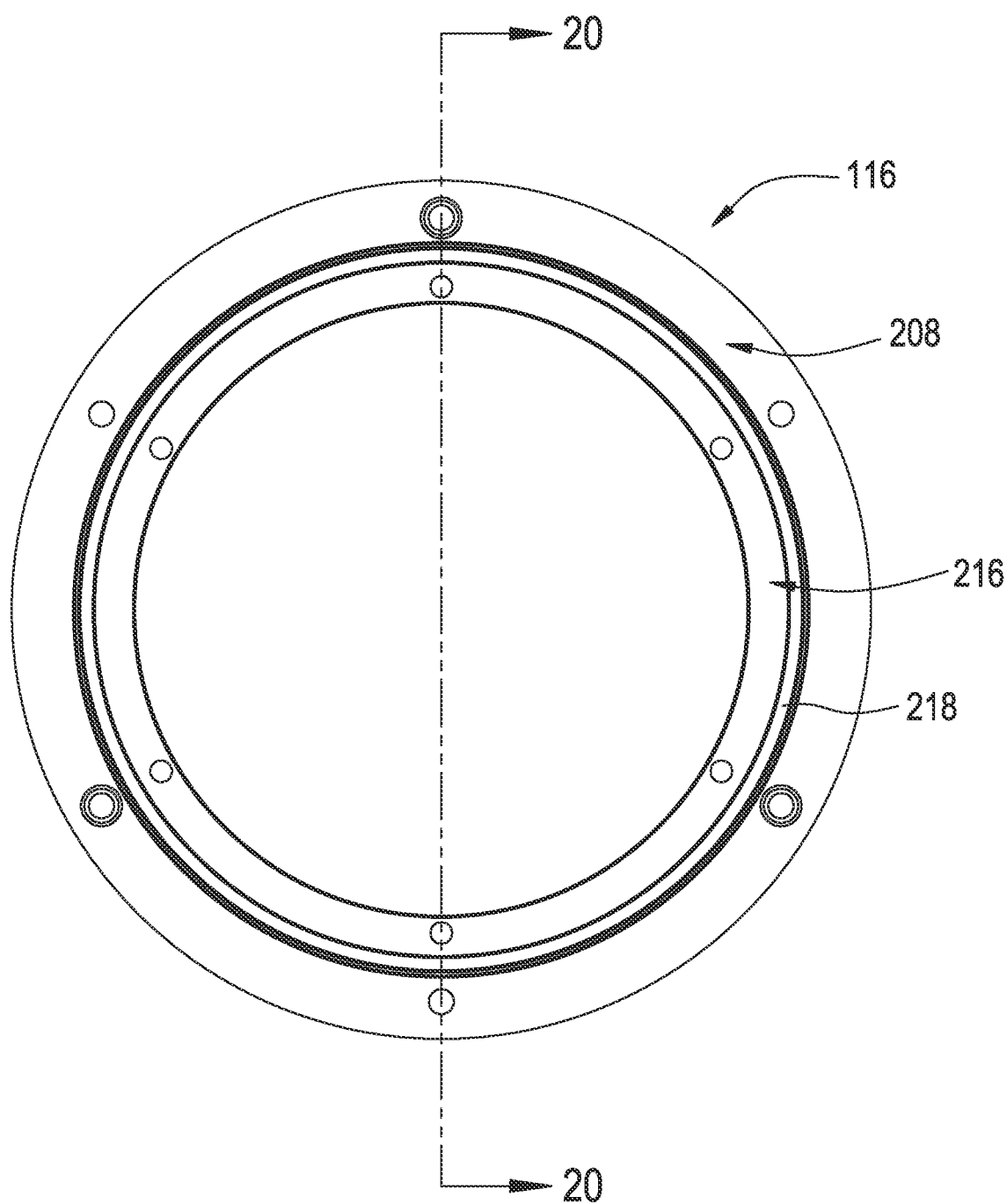
FIG. 19 is a front plan view of the exemplary cord winding comb head assembly in FIGS. 17 and 18.
Figure 20:
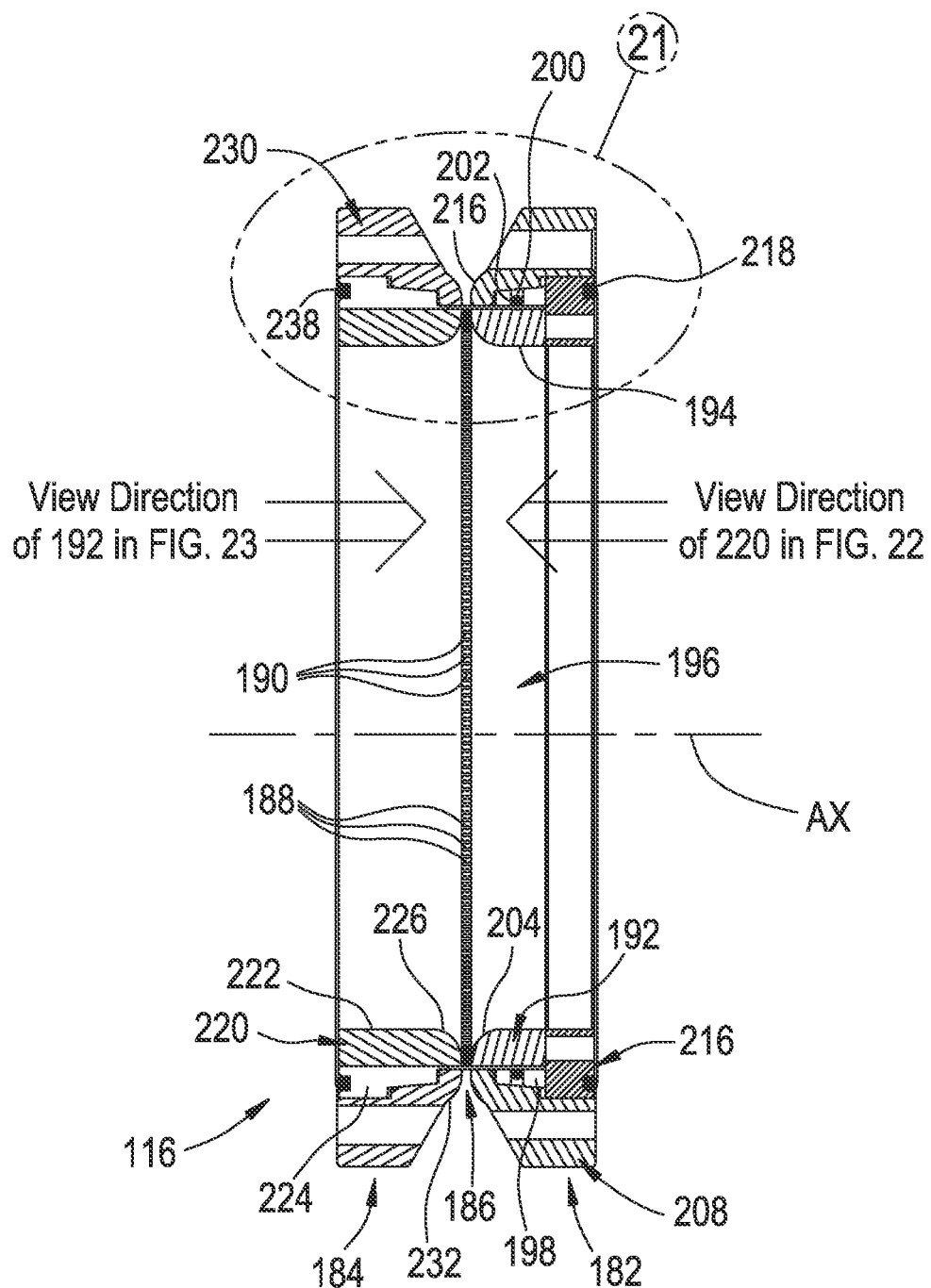
FIG. 20 is a cross-sectional side view of the exemplary cord winding comb head assembly in FIGS. 17-19 taken from along line 20-20 in FIG. 19.
Figure 21:
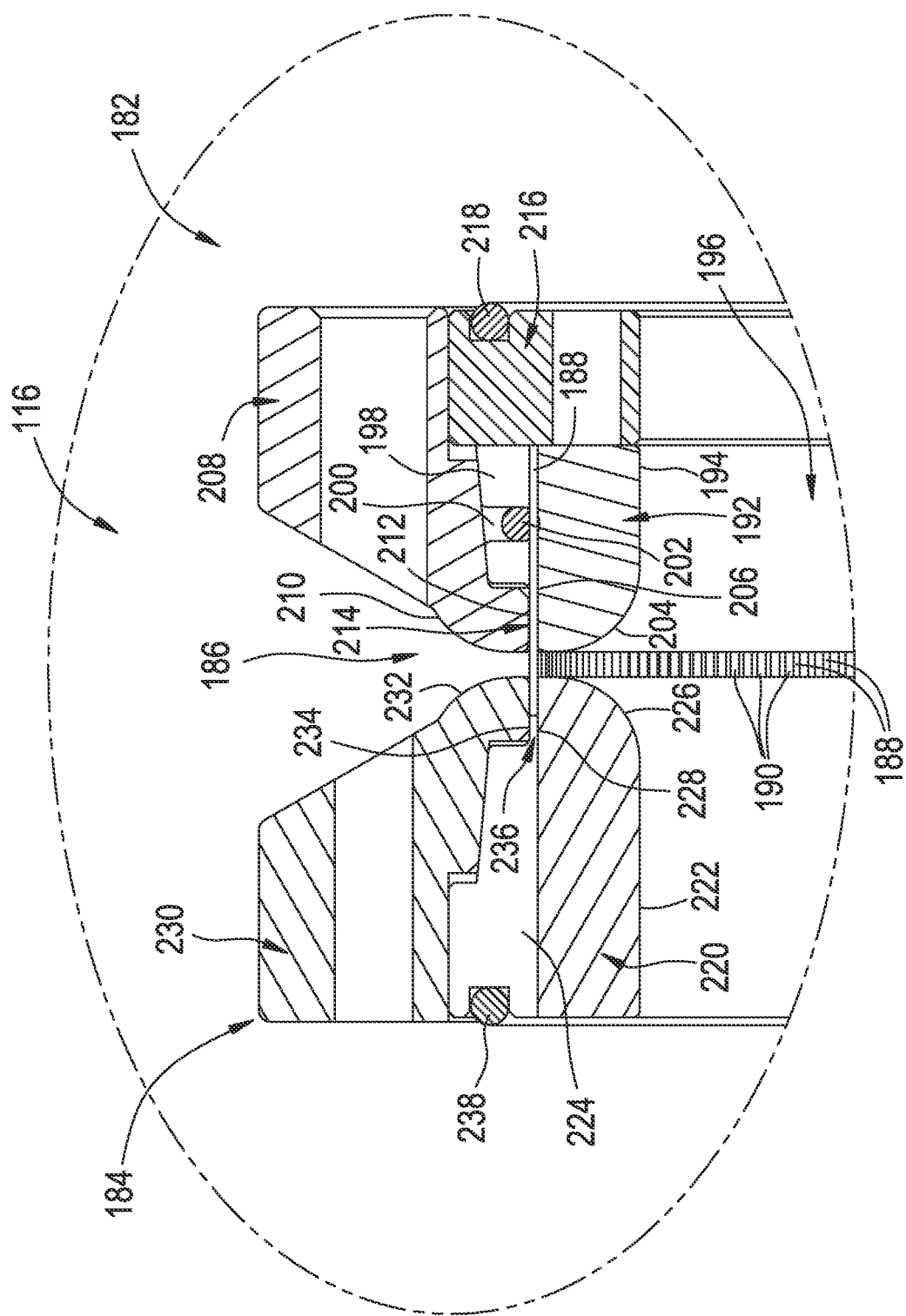
FIG. 21 is an enlarged view of the portion of the exemplary cord winding comb head assembly in FIGS. 17-20 identified as Detail 21 in FIG. 20.
Figure 22:
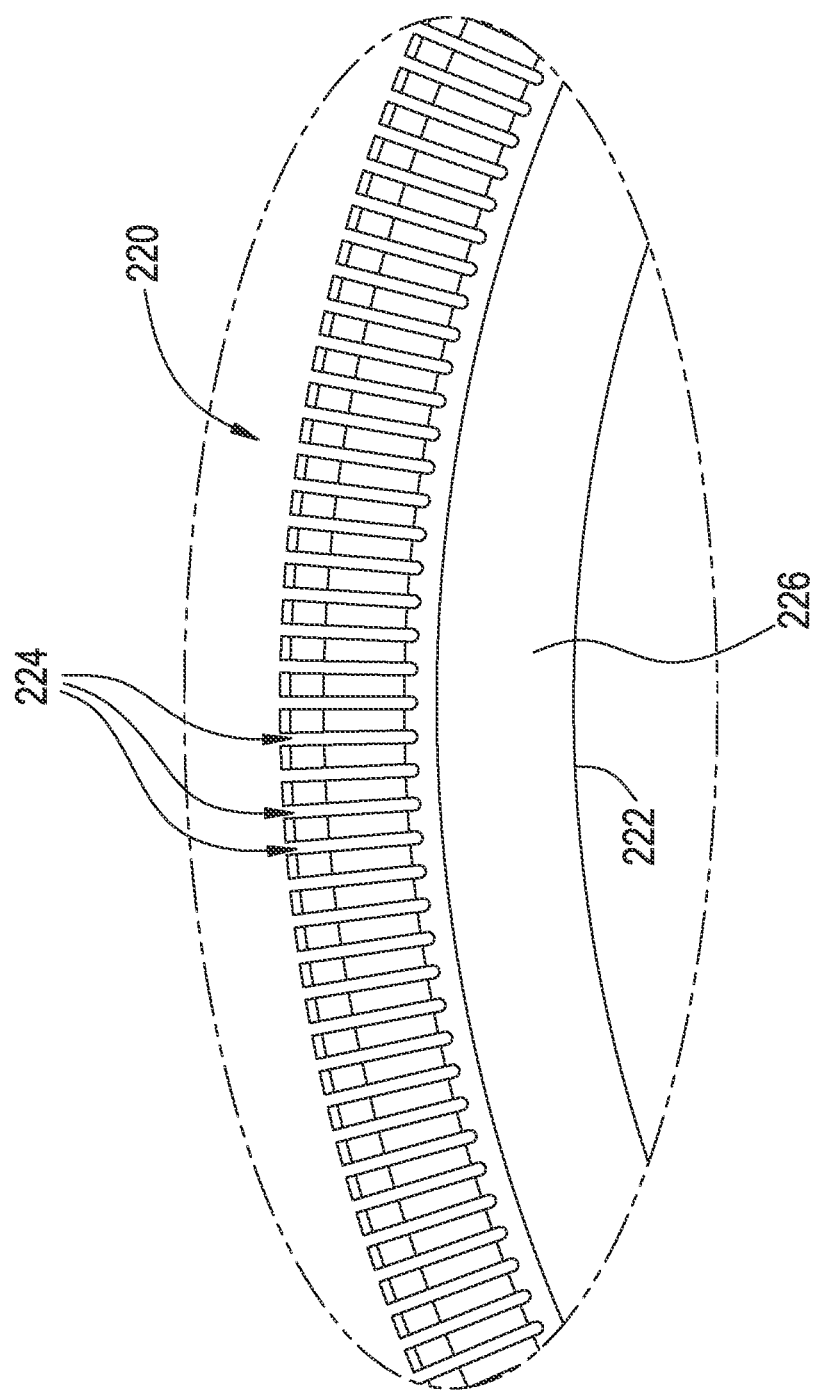
FIG. 22 is a front plan view of a greatly enlarged portion of the exemplary inner cord head ring in FIGS. 17-21.
Figure 23:
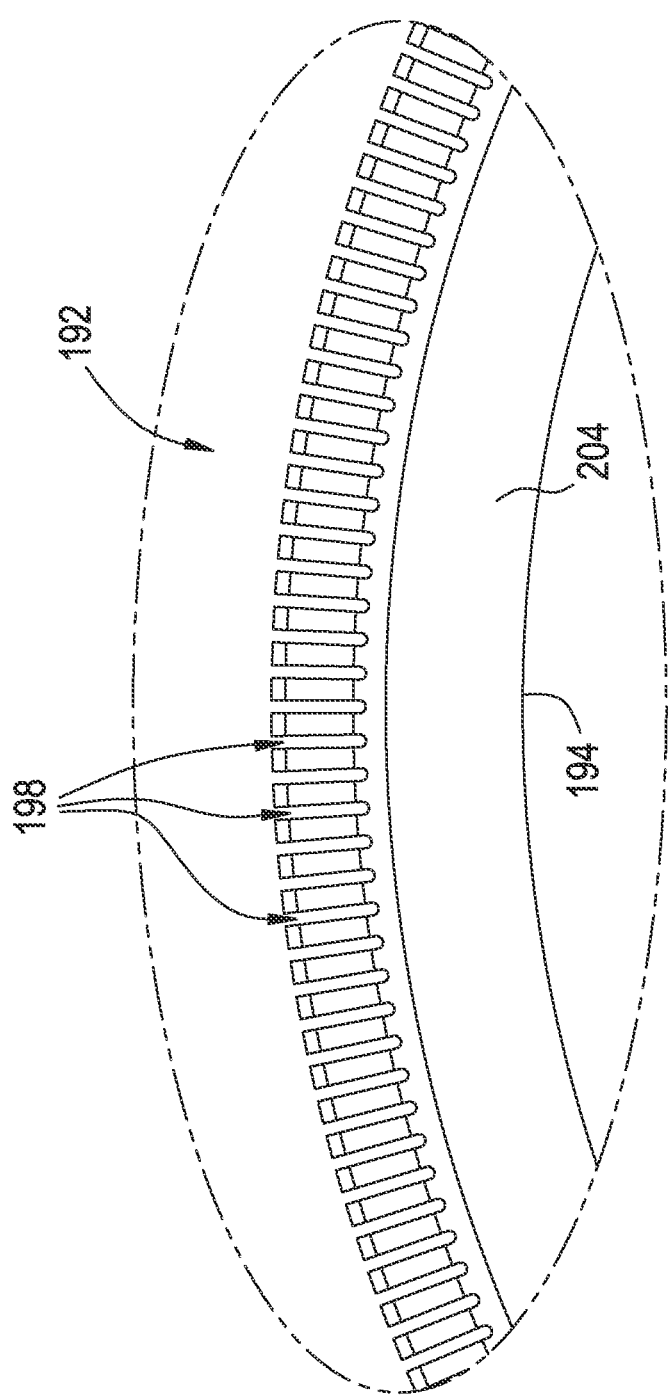
FIG. 23 is a front plan view of a greatly enlarged portion of the exemplary inner receiver cord head ring in FIGS. 17-21.

One method for ensuring each cord experiences a substantially similar cord path history through the winding machine is to guide the cords to the head assembly in a cylindrical form concentric around building mandrel 128 from tensioning system 114. However, given the actual access and clearance needs discussed above, a cord path configuration was designed from tensioning system 114 to head assembly 116 that provides practical equipment and part building access as well as the desired spring torsional balance. As shown in FIG. 16, such a cord path configuration separates the reinforcing cords coming from tensioning system 114 into three approximately equal groups. In a preferred arrangement, each group 106A, 106B and 106C is composed of reinforcing cords that will be wrapped onto the building mandrel in a continuous side-by-side pattern. Each cord group can be further separated into approximately equal subgroups, where each group has approximately the same number of subgroups and each subgroup has approximately the same number of cords. In a preferred arrangement, such a cord path configuration can support delivery of the cords to head assembly 116 such that each cord applied during the winding operation will have two siblings with one sibling applied 120 degrees and another sibling 240 degrees from that cord. Such a cord and its siblings will have experienced a substantially similar angular cord path through the contacting surfaces of the cord comb guides. While the cord path for each cord applied to the building mandrel may be slightly different from the cord path of the cord adjacent to it, it will be symmetrically balanced around the circumference of the building mandrel. Therefore, the resulting flexible spring member will be torsionally balanced.

FIGS. 17-23 illustrate one exemplary construction of cord winding comb head assembly 116 in additional detail. As discussed above, winding machine 118 applies all of the reinforcing cords of a given layer or ply onto building mandrel 128 simultaneously by rotating and translating the building mandrel through head assembly 116 which can be maintained in a static condition relative to the building mandrel. Head assembly 116 aids in establishing a desired spacing and also guides reinforcing cords 106A, 106B and 106C onto building mandrel 128 during the winding operation. In a preferred arrangement, head assembly 116 is mounted concentric to rotational axis AX of building mandrel 128, and will preferably have adequate clearance for the building mandrel and any materials applied to the surface of the building mandrel to pass through head assembly 116 without contact.

Head assembly 116 includes a retaining ring assembly 182 and a receiving ring assembly 184 that are supported in spaced relation to one another such that a cord head throat 186 is defined therebetween. A plurality of guide elements 188 extend between and operatively engage retaining ring assembly 182 and receiving ring assembly 184 to bridge cord head throat 186. Guide elements 188 are disposed in circumferentially spaced relation to one another about rotational axis AX such that cord head orifices 190 are formed between adjacent ones of guide elements 188 with a plurality of cord head orifices disposed circumferentially about rotational axis AX.

Retaining ring assembly 182 can include an inner retaining ring 192 with an inner surface 194 that at least partially defines an opening 196 extending through head assembly 116. Inner retaining ring 192 can include a plurality of radial slots 198 that extend axially therethrough radially outward of inner surface 194. In a preferred arrangement, radial slots 198 are dimensioned to receive one of guide elements 188.

In some cases, inner retaining ring 192 can also include an annular groove 200 dimensioned to receive an elastomeric ring 202 that abuttingly engages and thereby at least partially retains guide elements 188 within radial slots 198. Inner retaining ring 192 can also include a curved or otherwise contoured surface 204 that extends from along inner surface 194 to a surface 206 that faces radially outward and along which guide element 188 can be disposed. Retaining ring assembly 182 can also include an outer retaining ring 208 that at least partially receives inner retaining ring 192. Outer retaining ring 208 can include a curved or otherwise contoured surface 210 that extends to a surface 212 that faces radially inward. In an assembled condition, surfaces 206 and 212 can at least partially define an annular groove 214 within retaining ring assembly 182 through which guide elements 188 can project toward receiving ring assembly 184. In some cases, retaining ring assembly 182 can include a backing ring 216 that abuttingly engages inner retaining ring 192 and, in an installed condition, can bias the inner retaining ring into engagement with outer retaining ring 208. In some cases, backing ring 216 can at least partially receive an elastomeric ring 218 to abuttingly engage an associated support structure STR (FIG. 2).

Receiving ring assembly 184 can include an inner receiving ring 220 with an inner surface 222 that at least partially defines opening 196 extending through head assembly 116. Inner receiving ring 220 can include a plurality of radial slots 224 that extend axially therethrough radially outward of inner surface 222. In a preferred arrangement, radial slots 224 are dimensioned to receive one of guide elements 188. Inner receiving ring 220 can also include a curved or otherwise contoured surface 226 that extends from along inner surface 222 to a surface 228 that faces radially outward and along which guide element 188 can be received and extend into radial slots 224. Receiving ring assembly 184 can also include an outer receiving ring 230 that at least partially receives inner receiving ring 220. Outer receiving ring 230 can include a curved or otherwise contoured surface 232 that extends to a surface 234 that faces radially inward. In an assembled condition, surfaces 228 and 234 can at least partially define an annular groove 236 within receiving ring assembly 184 through which guide elements 188 can be received from along retaining ring assembly 182. In some cases, inner receiving ring 220 can at least partially receive an elastomeric ring 238 to abuttingly engage an associated support structure STR (FIG. 2).

It will be appreciated that cord placement control increases as the clearance between the minimum diameter of head assembly 116 at the cord head orifices and the working surface of the building mandrel decrease. The lower limit of the inner diameter of the head assembly at the cord head orifices is defined by the working mandrel size, the number of cords to be applied, the required orifice size to allow passage of the treated cord and, preferably, knotted treated cord connections, as well as the circumferential thickness of the cord separation features with smooth radii edges.

The circumferential thickness of the cord separation features is typically the limiting factor to a head assemblies minimum diameter at the cord head orifices. This circumferential thickness is typically limited by fabrication capabilities to produce the thin metallic members with smooth radii contact surfaces used to circumferentially separate the cords. These metallic members should have smooth radii surfaces to avoid damaging the cord and the dry coating on the cord's surface. The subject construction has resolved this fabrication limitation by using metal dowel pins or round wire segments to form the cord separation features. Because the dowel pins or wire segments are cylindrical and are formed by drawing or centerless grinding, they have smooth radii cord contact surfaces. Additionally, the subject design also allows adjustment of the axial distance between the two halves of the head assembly to form square or rectangular cord head orifices. The use of a rectangular cord head orifice is advantageous for minimizing the head assembly diameter at the cord head orifices while enabling the orifices to pass knots used to join two lengths of cord together. To reduce the load applied to the pins/dividers by the cord, and redirect the cord into and out of the cord head orifices, the subject construction incorporates annularly radiused surfaces 204, 210, 226 and 232 on the ID and OD of the head assembly adjacent to the cord head orifices.

As discussed above, the subject winding process can use a lathe-type winding machine 118 that includes a head stock 124 and a tail stock 126 that rotates building mandrel 128 as well as a base 120 that translates the building mandrel through static head assembly 116. On either end of building mandrel 128 are support spindles 130 of the same diameter as the building mandrel. The Support spindles are locations to initially anchor the reinforcing cords, and to start and stop each cord wrap cycle (aka 'tow').

As building mandrel 128 rotates and translates through head assembly 116, the relative motion causes the anchored cord to be towed out of the head assembly and wrapped onto and around the outside diameter of the building mandrel. The rotational drive motion of the building mandrel is conveyed through a shaft that passes through a support spindle closest to powered head stock 124. Building mandrel 128 is supported on its opposite end using an unpowered tail stock 126 with a shaft that passes through the support spindle closest to the tail stock. Both support spindles are mounted to their respective through shafts using one-way clutch bearings. The clutch bearings translate rotational motion to the support spindles when the support spindles resist rotation in a configured rotational direction (i.e., CW or CCW). Having support spindles 130 rotate in one-to-one (1:1) synchronization with building mandrel 128 is beneficial when starting or stopping a cord tow on the support spindle or transitioning the cord tow from the support spindle to the building mandrel to ensure control of the cord wrap angle. The clutch bearings also allow free rotation of the support spindles relative to their through shafts when rotated in the opposite rotational direction (i.e., CCW or CW). This rotational configuration of the support spindles is utilized to avoid consuming costly cord onto the support spindle after a tow cycle, or when wrapping rubber onto building mandrel 128, or doing other operations that require rotation of the building mandrel.

As discussed above, control system 132 can be communicatively coupled with any one or more features, components and/or systems of system 100. For example, winding machine 118 can include a server or supply system 240 to feed a controlled length of elastomeric material (e.g., calendared gum rubber) to building mandrel 128. This elastomeric material can be wrapped around the building mandrel with an axial overlap splice, such as a splice width within a range of from approximately one (1) millimeter to approximately ten (10) millimeters, for example. A typical uncured body of a flexible spring member can have three axial splices; one splice each for the inner liner, friction ply, and cover ply of uncured elastomeric material (e.g., gum rubber). The winding machine controls the location of the axial splices and evenly distributes them around the circumference of the flexible spring member. Again, it will be appreciated by those of skill in the art that at least the spliced sheets of elastomeric material (e.g., the inner liner, the friction ply and/or the cover layer) will, when vulcanized or otherwise cured, become seamless, integrally-formed layers of elastomeric material.

FIGS. 24-34 illustrate one example of a method of at least partially manufacturing a flexible spring member in accordance with the subject matter of the present disclosure. In such case, each cord tow can be anchored or otherwise secured to a support spindle 130 as is represented by line 242 in FIG. 24. Next, a layer of elastomeric material 244 can be anchored to building mandrel 128 and wound around at least the building mandrel, as shown in FIG. 25. Winding machine 118 rotates and translates mandrel 128 and support spindles 130 through head assembly 116 to apply a layer of seamless wound reinforcing cords 246 over elastomeric material 244, as shown in FIG. 26. Next, the ends of reinforcing cords 246 are secured to mandrel 128 and/or support spindles 130, as is represented in FIG. 27 by lines 248. Reinforcing cords 246 in the areas between mandrel 128 and support spindles 130 can then be severed, as is represented by areas 250 in FIG. 28.

With further reference to the subject method, a layer of elastomeric material 252 can be anchored to building mandrel 128 overtop of reinforcing cords 246 and wound around at least the building mandrel, as shown in FIG. 29. Winding machine 118 rotates and translates mandrel 128 and support spindles 130 through head assembly 116 to apply a layer of seamless wound reinforcing cords 254 over elastomeric material 252, as shown in FIG. 30. The ends of reinforcing cords 254 are secured to mandrel 128 and support spindles 130, as is represented in FIG. 31 by lines 256. Reinforcing cords 254 in the areas between mandrel 128 and support spindles 130 can then be severed, as is represented by areas 258 in FIG. 32. A layer of elastomeric material 260 can be anchored to building mandrel 128 overtop of reinforcing cords 254 and wound around at least the building mandrel, as shown in FIG. 33. Building mandrel 128 can then be decoupled from support spindles 130 and winding machine 118 for further processing, such as is discussed hereinafter.

The building mandrel for an elastomeric sleeve assembly that is cured directly on the building mandrel can be constructed as a hollow metal (e.g., aluminum, stainless steel) tube with female internal positive rotational drive features (e.g., splines). This type of mandrel can be placed inside an inflatable 'curing bag' inside of a curing press, such as may be used to vulcanize or otherwise cure the elastomeric sleeve assembly into a flexible spring member. Once loaded into the curing press, the curing bag can be inflated against the uncured elastomeric sleeve assembly to control the shape and/or configuration of the uncured elastomeric sleeve assembly and set its surface texture during the vulcanization or other curing process. Then the curing press will direct hot air or steam through the inside of the metal building mandrel. The hot air or steam will transfer heat through the walls of the metal building mandrel into the elastomeric sleeve assembly causing it to vulcanize a specific planned amount.

After the planned vulcanization or other curing cycle is complete, the curing press may retard the rubber vulcanization rate by removing thermal energy from the part by pumping cooler water or air through the inside of the building mandrel. Then, the curing bag will deflate and the building mandrel can be removed from the curing press. At this point the vulcanized elastomeric sleeve assembly can be removed from the building mandrel in a suitable manner, such as with the assistance of gas or liquid inflation. The sleeve can then be cut into prescribed lengths corresponding to specific applications. If the rubber sleeve needs additional curing into a different shape; such as a barrel or tapered form, the cut sleeve can be stretched over a rigid form representing the desired inside dimensional configuration and then further vulcanized to set the shape and other mechanical properties. Alternatively to the use of a rigid form representing the desired inside shape of the flexible spring member, the sleeve may be placed inside a mold and stretched from the inside out using an inflation bladder to conform the partially cured sleeve to the mold's internal shape during additional vulcanization which will set the sleeve's final shape and mechanical properties.

The building mandrels that are used to produce uncured elastomeric sleeve assemblies that will be vulcanized off of the building mandrel can be constructed with provisions to inflate the elastomeric sleeve assembly and 'float' it off the mandrel without damage. This is typically accomplished using compressed air pumped through multiple small orifices covering the building mandrel's surface. Vacuum may be applied to these same orifices or a dedicated row of orifices to hold the first rubber ply to the building mandrel. Uncured elastomeric sleeve assemblies built on this type of mandrel will be removed after assembly, then cut to the correct length, and vulcanized inside a heated metal curing mold while being inflated to conform to the mold's internal surface.

Figure 35:
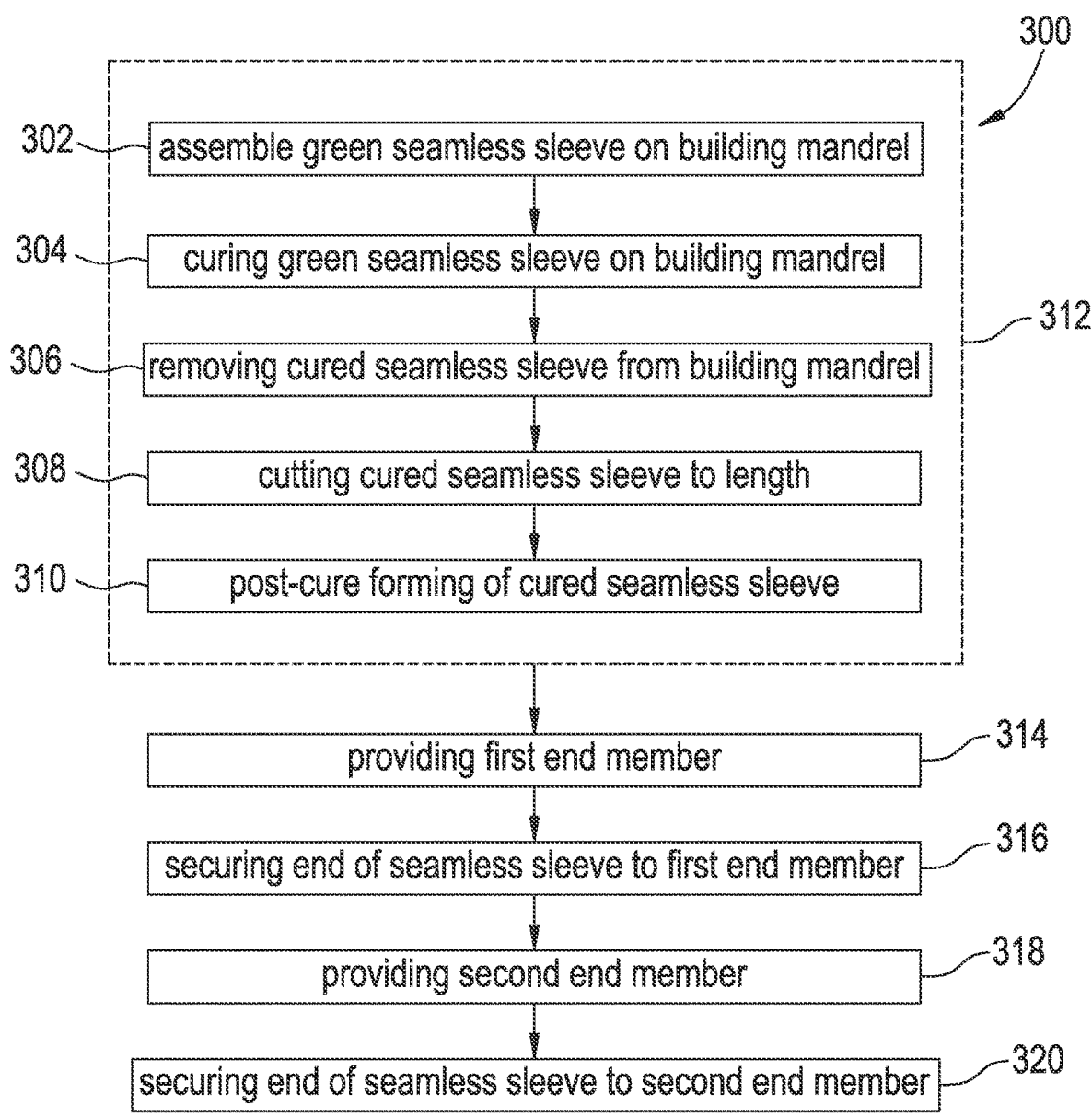
FIG. 35 is a representation of one example of a method of manufacturing a flexible spring member in accordance with the subject matter of the present disclosure.

One example of a method of assembly in accordance with the subject matter of the present disclosure is illustrated in FIG. 35, as is represented by item number 300. The method can include assembling a green (i.e., uncured) seamless sleeve on a building mandrel, such as has been described above in detail, as is represented in FIG. 35 by item number 302. Method 300 can also include curing the green seamless sleeve either on the building mandrel, such as has been described above, as is represented by item number 304, or after removal from the building mandrel, such as has been described above. Method 300 can further include removing the cured seamless sleeve from the building mandrel, such as has been described above, as is represented in FIG. 35 by item number 306. In some cases, method 300 can include cutting the cured seamless sleeve to length and/or into one or more sleeve segments, as is represented by item number 308. Furthermore, in some cases, method 300 can include post-cure forming of the cured seamless sleeve and/or sleeve segments, such as has been described above, as is represented by item number 310.

In some cases, actions 302-306 and, optionally, actions 308 and/or 310, can at least partially form an action of providing a cured seamless flexible spring member in accordance with the subject matter of the present disclosure, such as is represented in FIG. 35 by item number 312. In which case, method 300 can include providing a first end member, as is represented by item number 314. Method 300 can also include securing an end of the cured seamless flexible spring member to the first end member such that a substantially fluid-tight seal is formed therebetween, as is represented by item 316. Method 300 can further include providing a second end member, as is represented by item number 318. And, method 300 can also include securing an end of the cured seamless flexible spring member to the second end member such that a substantially fluid-tight seal is formed therebetween, as is represented by item 320.

Figure 36:
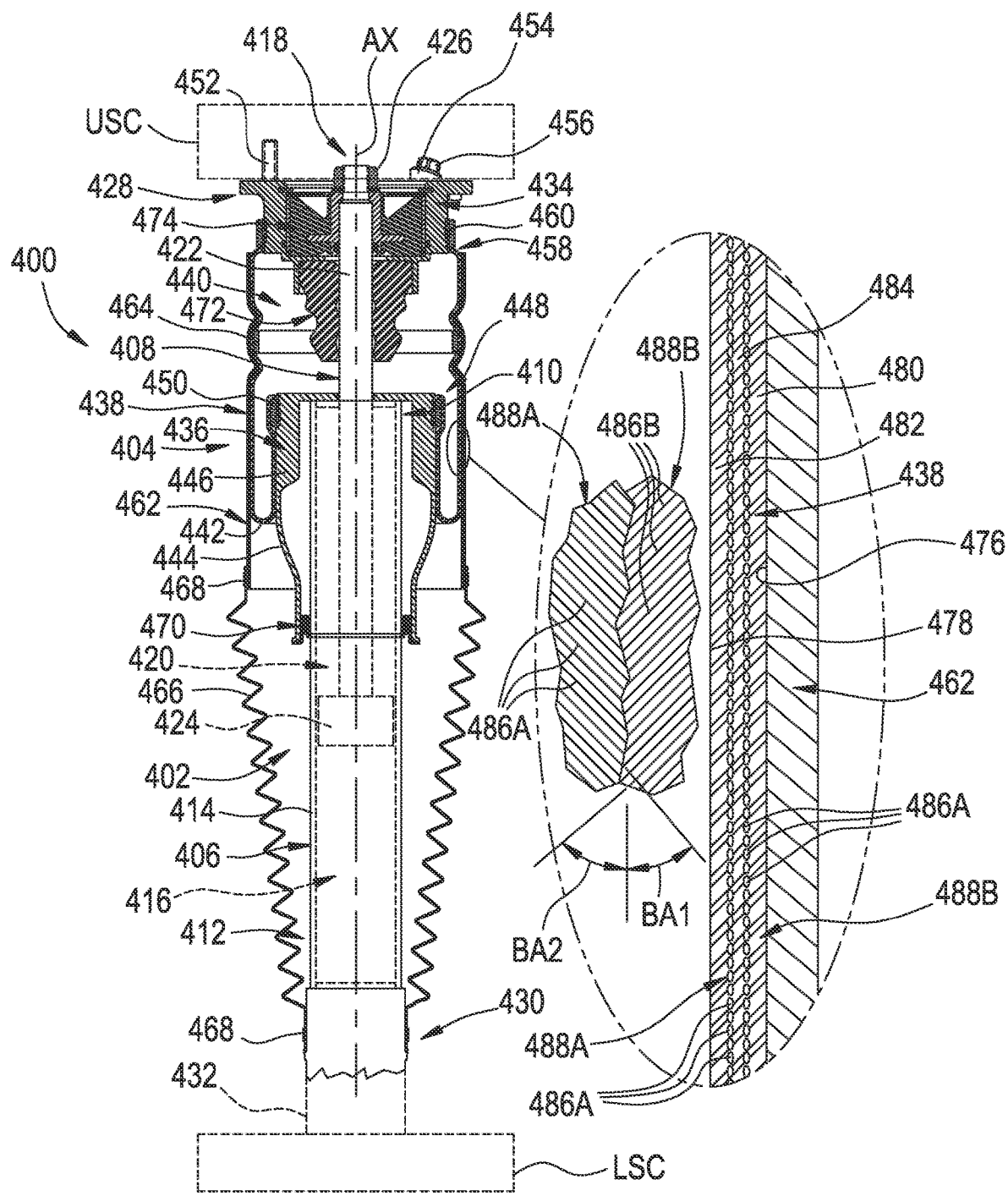
FIG. 36 is a cross-sectional side view of one example of a gas spring and damper assembly that includes a flexible spring member with a seamless reinforcing ply construction in accordance with the subject matter of the present disclosure.

One example of an assembly that includes a flexible spring member having a "seamless" construction in accordance with the subject matter of the present disclosure, such as may be at least partially formed using a system and/or method in accordance with the subject matter of the present disclosure, such as system 100 and/or method 300, for example, is shown in FIG. 36. A gas spring and damper assembly 400 includes a damper assembly 402 and a gas spring assembly 404 that is operatively connected with the damper assembly. It will be appreciated that, in some cases, gas spring and damper assembly 400 can, for example, be installed on an associated vehicle to at least partially form an associated suspension thereof. In such cases, gas spring and damper assembly 400 can undergo changes in length (i.e., can be displaced between extended and collapsed conditions) and thereby allowing the components of the vehicle and the suspension system thereof to dynamically move to accommodate forces and/or inputs acting on the vehicle, such as is well understood by those of skill in the art.

Gas spring and damper assembly 400 is shown in FIG. 36 as having a longitudinally-extending axis AX with damper assembly 402 and gas spring assembly 404 operatively secured to one another around and along axis AX. Damper assembly 402 is shown in FIG. 36 as extending along axis AX and including a damper housing 406 and a damper rod assembly 408 that is at least partially received in the damper housing. Damper housing 406 can extend axially between opposing housing ends 410 and 412, and can include a housing wall 414 that at least partially defines a damping chamber 416. Damper rod assembly 408 can extend lengthwise between opposing ends 418 and 420 and can include an elongated damper rod 422 and a damper piston 424 disposed along end 420 of damper rod assembly 408. Damper piston 424 is received within damping chamber 416 of damper housing 406 for reciprocal movement along the housing wall in a conventional manner. A quantity of damping fluid (not shown) can be disposed within damping chamber and damper piston 424 can be displaced through the damping fluid to dissipate kinetic energy acting on gas spring and damper assembly 400, again, in a conventional manner. Though damper assembly 402 is shown and described herein as having a conventional construction in which a hydraulic fluid is contained within at least a portion of damping chamber 416, it will be recognized and appreciated that dampers of other types, kinds and/or constructions, such as pressurized gas or "air" dampers, for example, could be used without departing from the subject matter of the present disclosure.

Elongated rod 422 is shown in FIG. 36 projecting out of damper housing 406 such that the elongated rod is outwardly exposed from the damper housing and is externally accessible with respect to the damper housing. A connection feature 426, such as a plurality of threads, for example, can be provided on or along the elongated rod for use in operatively connecting gas spring and damper assembly 400 to an associated vehicle structure, a component of gas spring assembly 404 or another component of gas spring and damper assembly 400.

It will be appreciated that gas spring and damper assembly 400 can be operatively connected between associated sprung and unsprung masses of an associated vehicle (or other construction) in any suitable manner. For example, one end of the assembly can be operatively connected to the associated sprung mass with the other end of the assembly disposed toward and operatively connected to the associated unsprung mass. As shown in FIG. 36, for example, a first or upper end 428 of assembly 400 can be secured on or along a first or upper structural component USC, such as an associated vehicle body, for example, and can be secured thereon in any suitable manner. A second or lower end 430 of assembly 400 can be secured on or along a second or lower structural component LSC, such as an associated axle or suspension structure of a vehicle, for example, and can be secured thereon in any suitable manner. In some cases, damper assembly 402 can include a connection feature 432, such as a pivot or bearing mount (not shown), for example, that is operatively disposed along damper housing 406 and is adapted for securement to lower structural component LSC in a suitable manner.

Gas spring assembly 404 includes an end member 434, such as a top cap, bead plate or reservoir enclosure, for example. Gas spring assembly 404 also includes an end member 436, such as a roll-off piston or piston assembly, for example, that is disposed in axially-spaced relation to end member 434. A flexible spring member 438, in accordance with the subject matter of the present disclosure, can be operatively connected between end members 434 and 436 in a substantially fluid-tight manner such that a spring chamber 440 is at least partially defined therebetween. In some cases, flexible sleeve 438 can form a rolling lobe 442 that is displaced along an outer surface 444 of end member 436 as gas spring and damper assembly 400 moves between extended and compressed conditions. As shown in FIG. 2, end member 436 can include a wall portion 446 along which one end 448 of flexible spring member 438 is operatively connected, such as, for example, through the use of a retaining ring 450 that can be crimped radially inward or otherwise deformed to form a substantially fluid-tight connection therebetween.

As discussed above, gas spring and damper assembly 400 can be operatively connected between associated sprung and unsprung masses of an associated vehicle (or other structure) in any suitable manner. As shown in FIG. 36, for example, end 428 of assembly 400 can be secured on or along upper structural component USC in any suitable manner. As one example, one or more securement devices, such as mounting studs 452, for example, can be included along end member 434. In some cases, the one or more securement devices (e.g., mounting studs 452) can project outwardly from end member 434 and can be secured thereon in a suitable manner, such as, for example, by way of a flowed-material joint (not shown) or a press-fit connection (not identified). Additionally, such one or more securement devices can extend through mounting holes (not shown) in upper structural component USC and can receive one or more threaded nuts (not shown) or other securement devices, for example. Additionally, or as an alternative to one or more of mounting studs 452, one or more threaded passages (e.g., blind passages and/or through passages) could be used in conjunction with a corresponding number of one or more threaded fasteners.

A fluid communication port can optionally be provided to permit fluid communication with spring chamber 440, such as may be used for transferring pressurized gas into and/or out of the spring chamber, for example. It will be appreciated that such a fluid communication port can be provided in any suitable manner. As one example, a fluid communication port could extend through one or more of mounting studs 452. As another example, end member 434 can include a transfer passage 454 extending therethrough that is in fluid communication with spring chamber 440. It will be appreciated, however, that any other suitable fluid communication arrangement could alternately be used. In some cases, passage 454 can be adapted to receive a suitable connector fitting 456, such as may be suitable for operatively connecting gas transfer lines or other elements of a pressurized gas system to the gas spring and damper assembly.

An opposing end 458 of flexible sleeve 438 can be secured on or along end member 434 in any suitable manner. As one example, a portion of the flexible sleeve can be secured in abutting engagement along a wall portion of end member 434 by way of a retaining ring 460 that can be crimped radially inward or otherwise deformed to form a substantially fluid-tight connection therebetween. Additionally, gas spring and damper assembly 400 can, optionally, include an external sleeve or support, such as a restraining cylinder 462, for example, that can be secured on or along the flexible sleeve in any suitable manner. As one example, a portion of the flexible sleeve can be secured in abutting engagement along a wall portion of restraining cylinder 462 by way of a retaining ring 464 that can be crimped radially outward or otherwise deformed to form engagement between the restraining cylinder and the flexible sleeve. It will be appreciated, however, that other arrangements could alternately be used.

Gas spring and damper assembly 400 can also, optionally, include one or more additional components and/or features. For example, an accordion-type bellows 466 can extend along at least a portion of the gas spring and damper assembly and can be secured to one or more components thereof in any suitable manner, such as by way of retaining rings 468, for example. As another example, a seal assembly 470 can be disposed in fluid communication between damper housing 406 and end member 436, such that a substantially fluid-tight seal can be formed therebetween. As a further example, a jounce bumper 472 can be disposed within spring chamber 440 and can be supported on or along one of end members 434 and 436 in a suitable manner. In the arrangement shown in FIG. 36, jounce bumper 472 is received along elongated rod 422 and supported on end member 434. It will be appreciated, however, that other configurations and/or arrangements could alternately be used. Gas spring and damper assembly 400 can also include a damper rod bushing 474 that is operatively connected between elongated rod 422 of damper assembly 402 and end member 434 of gas spring assembly 404. In this manner, forces acting on one of damper rod 422 and end member 434 that are experienced during use of the gas spring and damper assembly are transmitted or otherwise communicated through damper rod bushing 474 to the other of damper rod 422 and end member 434.

As indicated above, the flexible wall of flexible spring member 438 can be formed from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible spring member 438 can include an outer surface 476 and an inner surface 478, which can at least partially define spring chamber 440. Additionally, as identified in FIG. 36, flexible spring member 438 can include an outer or cover ply 480 that at least partially forms outer surface 476, an inner or liner ply 482 that at least partially forms inner surface 478, and one or more reinforcing plies disposed between outer and inner surfaces 476 and 478. Furthermore, as discussed above, flexible spring member 438 can include one or more reinforcing layers or plies. In a preferred arrangement, the one or more reinforcing plies are of a seamless construction and/or configuration, such as has been described in detail above. That is, the one or more reinforcing plies can include one or more lengths of filament material that are at least partially embedded therein. Where two or more reinforcing layers or plies are included, one or more friction plies 484 can be included and disposed between outer and inner plies 480 and 482, as shown in FIG. 36. As discussed above, outer ply 480, inner ply 482 and any friction plies 484, if included, are preferably formed from unreinforced elastomeric material between which the one or more reinforcing layers or plies are formed.

It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization, for example.

Additionally, it will be appreciated that the one or more lengths of filament material can be oriented in any suitable manner. As one example, flexible spring member 438 is shown in FIG. 36 as including a plurality of filament segments 486A of one reinforcing ply 488A disposed at one bias angle BA1 and a plurality of filament segments 486B of another reinforcing ply 488B disposed another bias angle BA2. It will be appreciated that any suitable bias angles can be used, such as bias angles within a range of from approximately 3 degrees to approximately 87 degrees, for example. In some cases, the filament segments can be disposed at approximately the same bias angle but oriented in the opposing direction, such as is represented in FIG. 36 by reference dimensions BA1 and BA2, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A system for manufacturing a flexible spring member dimensioned for forming an associated gas spring assembly, said system comprising:
    a creel assembly supporting a plurality of spools containing at least one cord having an indeterminate length such that a plurality of cords are supported on said creel assembly;
    a tensioner assembly spaced apart from said creel assembly and operative to tension said plurality of cords received from said creel assembly;
    a building mandrel disposed in spaced relation to said tensioner assembly, said building mandrel supported for rotation about a longitudinal axis and reciprocal translation along said longitudinal axis; and,
    a head assembly supported in a substantially fixed longitudinal position and having a first side and a second side longitudinally opposite said first side, said head assembly including an opening extending therethrough and positioned co-axially relative to said building mandrel such that said building mandrel passes through said opening in said head assembly during reciprocal translation along said longitudinal axis, said head assembly operative to position and redirect said plurality of cords onto said building mandrel during translation and rotation of said building mandrel from said first side of said head assembly to said second side of said head assembly and during translation and rotation of said building mandrel from said second side of said head assembly to said first side of said head assembly.

2. A system according to claim 1, wherein said creel assembly is one of a plurality of creel assemblies each supporting a plurality of spools containing at least one cord having an indeterminate length.

3. A system according to claim 1, wherein said creel assembly includes a brake system operatively engaging at least one of said plurality of spools to generate rotational drag thereon.

4. A system according to claim 1 further comprising a cord path arrangement in which said plurality of cords are separated after said tensioner assembly into at least three groupings of cords having an approximately equal number of individual cords.

5. A system according to claim 1 further comprising a machine base supporting said building mandrel and displaceable for translation of said building mandrel along said longitudinal axis.

6. A system according to claim 1 further comprising a control system communicatively coupled with at least one of said tensioner assembly and said building mandrel for operation thereof.

7. A system for manufacturing a flexible spring member dimensioned for forming an associated gas spring assembly, said system comprising:
a creel assembly supporting a plurality of spools containing at least one cord having an indeterminate length such that a plurality of cords are supported on said creel assembly;
a tensioner assembly spaced apart from said creel assembly and operative to tension approximately equal predetermined lengths of said plurality of cords received from said creel assembly;
a building mandrel disposed in spaced relation to said tensioner assembly, said building mandrel supported for rotation about a longitudinal axis and translation along said longitudinal axis;
a cord path arrangement in which said plurality of cords are separated after said tensioner assembly into at least three groupings of cords having an approximately equal number of individual cords with at least two of said three groupings of cords separated from one another such that a clearance window providing access to said building mandrel is accessible therethrough; and,
a head assembly supported in a substantially fixed longitudinal position, said head assembly including an opening extending therethrough and positioned co-axially relative to said building mandrel such that said building mandrel passes through said opening in said head assembly during translation along said longitudinal axis, said head assembly operative to position and redirect said plurality of cords onto said building mandrel during translation and rotation thereof relative to said head assembly.

8. A system according to claim 4, wherein at least one individual cord in each of said at least three groupings of cords will have a substantially similar cord path between said tensioner assembly and said head assembly.

9. A system according to claim 8, wherein each of said individual cords in one of said at least three groupings of cords will have a substantially similar cord path between said tensioner assembly and said head assembly as one of said individual cords in each of the remaining two of said at least three groupings of cords.

10. A method of manufacturing a flexible spring member dimensioned for use in forming a gas spring assembly, said method comprising:
providing a plurality of cords having an indeterminate length;
tensioning approximately equal predetermined lengths of said plurality of cords;
directing said plurality of cords in a radially inward direction through a head assembly that is disposed in a fixed position;
securing a first end of said plurality of cords along a building mandrel that is rotatable about a longitudinal axis and translatable through said head assembly along said longitudinal axis;
applying a first layer of elastomeric material along said building mandrel; and,
rotating said building mandrel in a first rotational direction about said longitudinal axis and translating said building mandrel along said longitudinal axis in a first translational direction relative to said head assembly to tow at least a portion of said predetermined lengths of said plurality of cords through said head assembly and wrap at least said portion of said predetermined lengths of said plurality of cords along said first layer of elastomeric material to form a first reinforcing layer.

11. A method according to claim 10 further comprising securing a second end of said plurality of cords along said building mandrel opposite said first end of said plurality of cords.

12. A method according to claim 11 further comprising severing said plurality of cords along said second end.

13. A method according to claim 12 further comprising applying a second layer of elastomeric material along building mandrel over said first reinforcing layer.

14. A method according to claim 13 further comprising rotating said building mandrel in said first rotational direction about said longitudinal axis and translating said building mandrel along said longitudinal axis in a second translational direction relative to said head assembly that is opposite said first translational direction to tow at least a portion of said predetermined lengths of said plurality of cords through said head assembly and wrap at least said portion of said predetermined lengths of said plurality of cords along said second layer of elastomeric material to form a second reinforcing layer.

15. A method according to claim 14 further comprising securing a third end of said plurality of cords along said building mandrel opposite said second end of said plurality of cords.

16. A method according to claim 15 further comprising severing said plurality of cords along said third end.

17. A method according to claim 16 further comprising applying a third layer of elastomeric material along building mandrel over said second reinforcing layer.

18. A method according to claim 17 further comprising curing said first, second and third layers of elastomeric material on said building mandrel to encapsulate said first and second reinforcing layers therein to form a cured elongated body.

19. A method according to claim 18 further comprising cutting said cured elongated body into one or more flexible spring members.

20. A method of assembling a gas spring assembly, said method comprising:
providing first and second end members;
manufacturing a flexible spring member by a method according to claim 10;

securing said flexible spring member to said first and second end member such that a substantially fluid-tight seal is formed therebetween to at least partially define a spring chamber.

\* \* \* \* \*